US010127241B2

(12) United States Patent
Kusakabe

(10) Patent No.: US 10,127,241 B2
(45) Date of Patent: Nov. 13, 2018

(54) INFORMATION PROCESSING APPARATUS, METHOD FOR CONTROLLING THE SAME, AND STORAGE MEDIUM THEREFOR

(71) Applicant: CANON KABUSHIKI KAISHA, Tokyo (JP)

(72) Inventor: Yuki Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 14/076,534

(22) Filed: Nov. 11, 2013

(65) Prior Publication Data

US 2014/0137027 A1 May 15, 2014

(30) Foreign Application Priority Data

Nov. 14, 2012 (JP) .................................. 2012-250181

(51) Int. Cl.
*G06F 3/0484* (2013.01)
*G06F 17/30* (2006.01)

(52) U.S. Cl.
CPC .. *G06F 17/30144* (2013.01); *G06F 17/30126* (2013.01)

(58) Field of Classification Search
CPC ............................ G06F 3/0484; G06F 3/04842
USPC .......................................................... 715/781
See application file for complete search history.

(56) References Cited

U.S. PATENT DOCUMENTS 6,668,338 B1* 12/2003 Todd .................... G06F 9/4443
714/19
8,370,341 B1* 2/2013 Cromwell ......... G06F 17/30073
707/662
2008/0033948 A1 2/2008 Li

FOREIGN PATENT DOCUMENTS

| CN | 101118543 A | 2/2008 |
| CN | 102622442 A | 8/2012 |
| JP | 2012-43119 A | 3/2012 |

* cited by examiner

*Primary Examiner* — Andrea Leggett
(74) *Attorney, Agent, or Firm* — Canon USA, Inc. I.P. Division

(57) ABSTRACT

In an information processing apparatus connected to an external apparatus, when information indicating a change in a folder indicates that a new file has been appended to the folder, a document management application updates a screen so that existing files are arranged in order according to a specified sorting method and a new file is appended to a position, not according to the specified sorting method, at which the new file can be easily recognized.

24 Claims, 21 Drawing Sheets

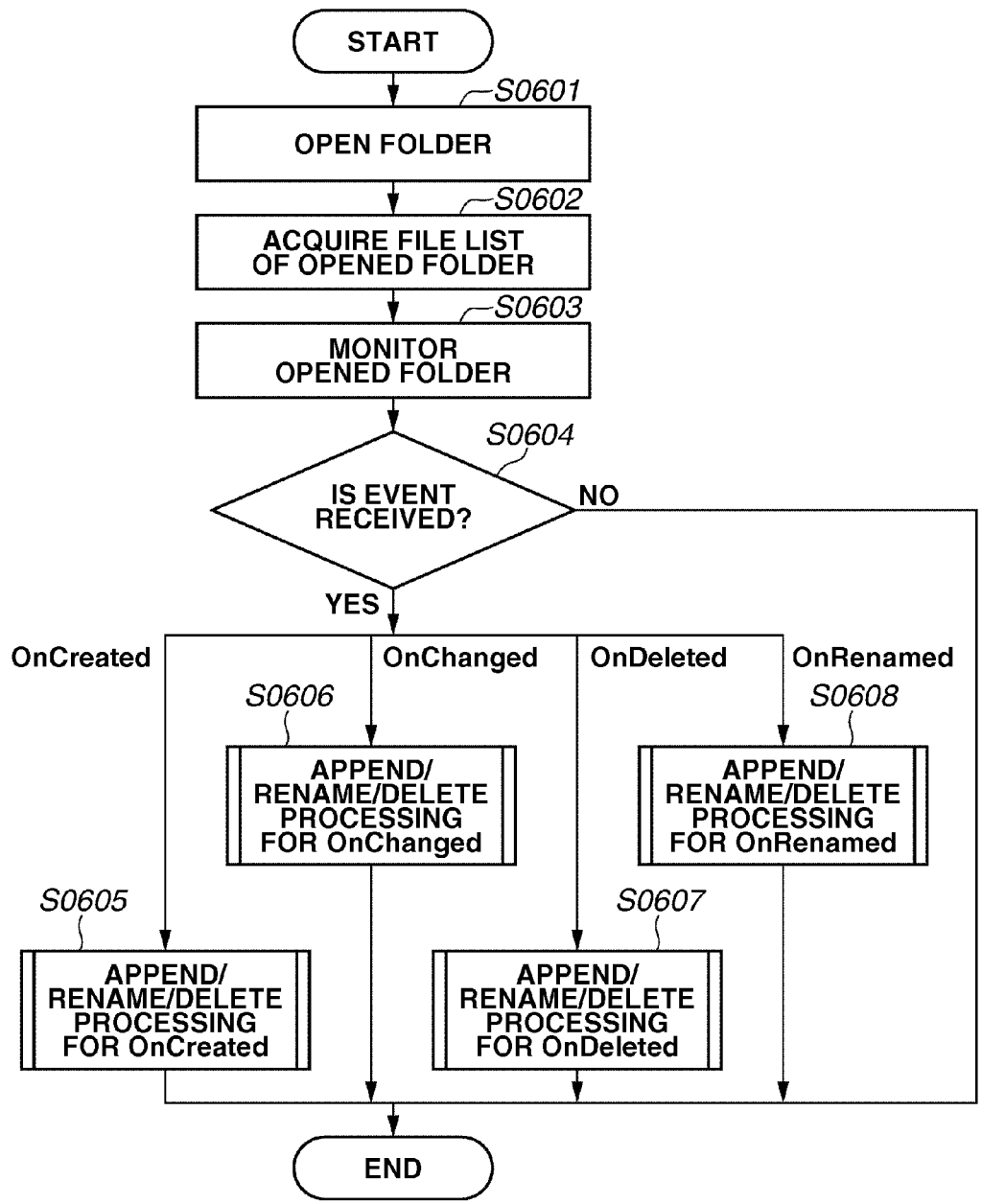

FIG.7

| No | EVENT CLASS | PRESENCE/ ABSENCE OF FILE LIST | PRESENCE/ ABSENCE OF ACTUAL FILE | PRESENCE/ ABSENCE OF FILE LIST OF ORIGINAL FILE | PRESENCE/ ABSENCE OF ACTUAL FILE OF ORIGINAL FILE | DISPLAY UPDATING METHOD |
|---|---|---|---|---|---|---|
| 1 | OnCreated | ○ | ○ | – | – | UPDATE EXISTING FILES |
| 2 | OnCreated | ○ | × | – | – | DELETE FROM FILE LIST |
| 3 | OnCreated | × | ○ | – | – | APPEND FILE TO END |
| 4 | OnCreated | × | × | – | – | NO OPERATION |
| 5 | OnChanged | ○ | ○ | – | – | UPDATE EXISTING FILES |
| 6 | OnChanged | ○ | × | – | – | DELETE FROM FILE LIST |
| 7 | OnChanged | × | ○ | – | – | APPEND FILE TO END |
| 8 | OnChanged | × | × | – | – | NO OPERATION |
| 9 | OnDeleted | ○ | ○ | – | – | UPDATE EXISTING FILES |
| 10 | OnDeleted | ○ | × | – | – | DELETE FROM FILE LIST |
| 11 | OnDeleted | × | ○ | – | – | NO OPERATION |
| 12 | OnDeleted | × | × | – | – | NO OPERATION |
| 13 | OnRenamed | ○ | ○ | ○ | ○ | UPDATE FILE HAVING FILE NAME AFTER RENAMING |
| 14 | OnRenamed | ○ | ○ | ○ | × | UPDATE FILE HAVING FILE NAME AFTER RENAMING, AND DELETE FILE BEFORE RENAMING FROM FILE LIST |
| 15 | OnRenamed | ○ | ○ | × | ○ | UPDATE FILE HAVING FILE NAME AFTER RENAMING |
| 16 | OnRenamed | ○ | × | ○ | ○ | DELETE FILE HAVING FILE NAME AFTER RENAMING FROM FILE LIST |
| 17 | OnRenamed | × | ○ | ○ | ○ | UPDATE FILE NAME BEFORE RENAMING TO FILE NAME AFTER RENAMING |
| 18 | OnRenamed | ○ | ○ | × | × | UPDATE FILE HAVING FILE NAME AFTER RENAMING |
| 19 | OnRenamed | ○ | × | ○ | × | DELETE FILE HAVING FILE NAME AFTER RENAMING, AND DELETE FILE HAVING FILE NAME BEFORE RENAMING FROM FILE LIST |
| 20 | OnRenamed | × | ○ | ○ | × | UPDATE FILE NAME BEFORE RENAMING TO FILE NAME AFTER RENAMING |
| 21 | OnRenamed | ○ | × | × | ○ | DELETE FILE HAVING FILE NAME AFTER RENAMING FROM FILE LIST |
| 22 | OnRenamed | × | ○ | × | ○ | APPEND FILE HAVING FILE NAME AFTER RENAMING TO END |
| 23 | OnRenamed | × | × | ○ | ○ | NO OPERATION |
| 24 | OnRenamed | ○ | × | × | × | DELETE FILE HAVING FILE NAME AFTER RENAMING FROM FILE LIST |
| 25 | OnRenamed | × | ○ | × | × | APPEND FILE HAVING FILE NAME AFTER RENAMING TO END |
| 26 | OnRenamed | × | × | ○ | × | DELETE FILE HAVING FILE NAME BEFORE RENAMING FROM FILE LIST |
| 27 | OnRenamed | × | × | × | ○ | NO OPERATION |
| 28 | OnRenamed | × | × | × | × | NO OPERATION |

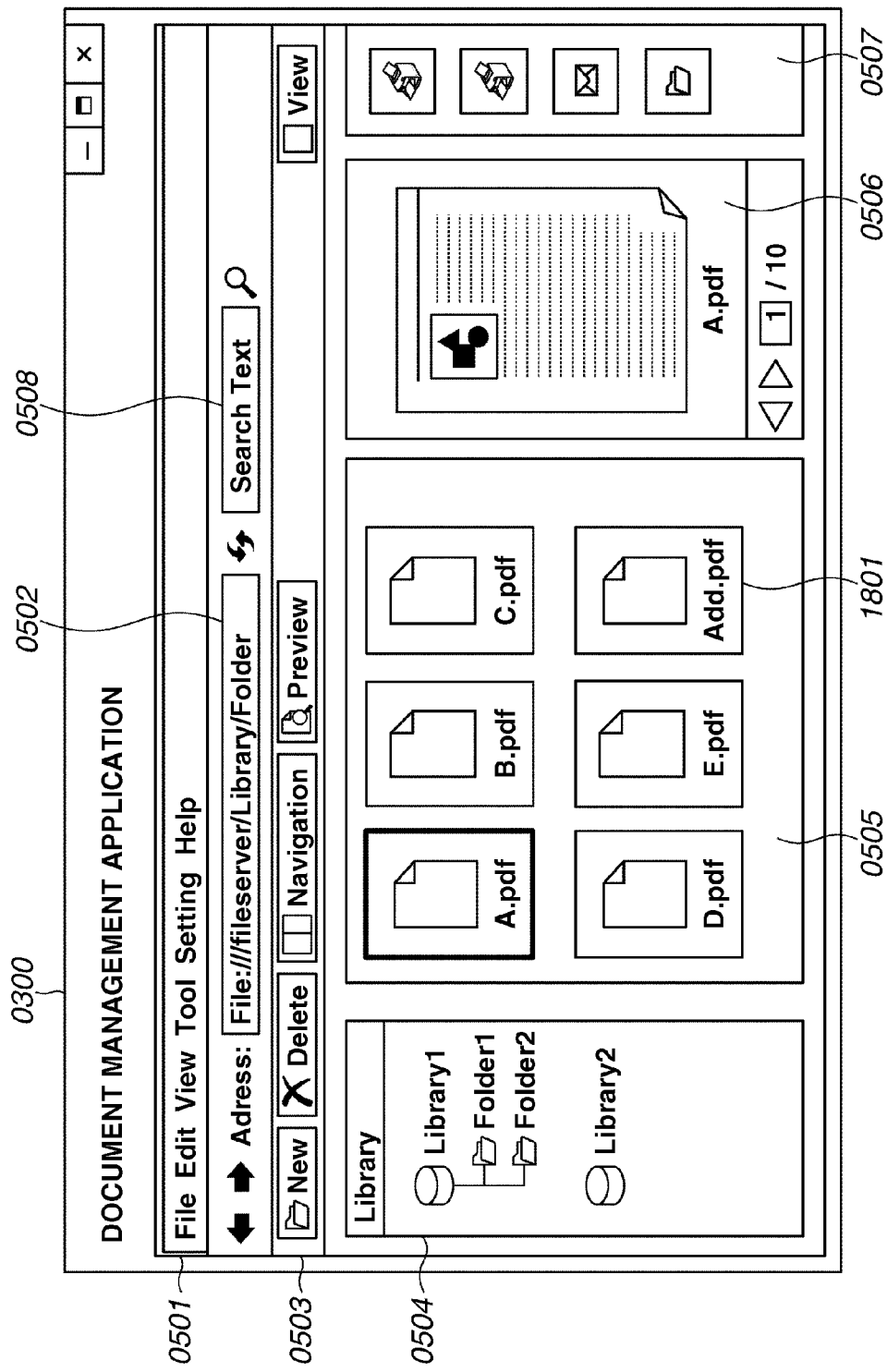

INFORMATION PROCESSING APPARATUS, METHOD FOR CONTROLLING THE SAME, AND STORAGE MEDIUM THEREFOR

BACKGROUND

Field of the Disclosure

Aspects of the present invention generally relate to an information processing apparatus for controlling display processing in a document management application, a method for controlling the information processing apparatus, and a storage medium therefor.

Description of the Related Art

When a plurality of information processing apparatuses is referring to a folder of a file server, the result of an operation for appending, editing, or deleting a file in the folder performed by a certain information processing apparatus may not be reflected on screens of other information processing apparatuses. For example, when a user keeps monitoring one folder, the user may be unable to notice a status change in the above-described folder.

As a technique for resolving this problem, Japanese Patent Application Laid-Open No. 2012-43119 discusses a technique for monitoring a specified folder, and, when a file is appended to the folder currently being monitored, notifying a user of the appended file by using a pop-up message.

With the conventional technique, however, when the user is performing an operation while monitoring a certain folder, for example, the user may be unable to notice the pop-up message depending on the display position of the pop-up message.

SUMMARY

Aspects of the present invention relate to enabling a user to easily recognize a change in a monitoring target folder.

According to an aspect of the present invention, an information processing apparatus connectable to an external apparatus includes a display unit configured to display a screen in which existing files in a folder of the external apparatus are arranged in order according to a specified sorting method, a receiving unit configured to receive information indicating a change in the folder from the external apparatus, and an updating unit configured to update display content of the screen according to the information received by the receiving unit. When the information indicating a change in the folder indicates that a new file has been appended to the folder, the updating unit updates the screen so that the existing files are arranged in order according to the specified sorting method and the new file is appended to a position at which the new file can be easily recognized by a user in order not according to the sorting method.

Further features of the present disclosure will become apparent from the following detailed description of exemplary embodiments with reference to the attached drawings.

BRIEF DESCRIPTION OF THE DRAWINGS

FIG. 6 is a flowchart illustrating processing for updating a file list.

FIG. 7 illustrates an example of a correspondence table of an event class, the presence or absence of the file list, and a display updating method.

FIG. 18 illustrates an example of a UI of the document management application.

DESCRIPTION OF THE EMBODIMENTS

Various exemplary embodiments, features, and aspects of the invention will be described in detail below with reference to the drawings.

Figure 1:
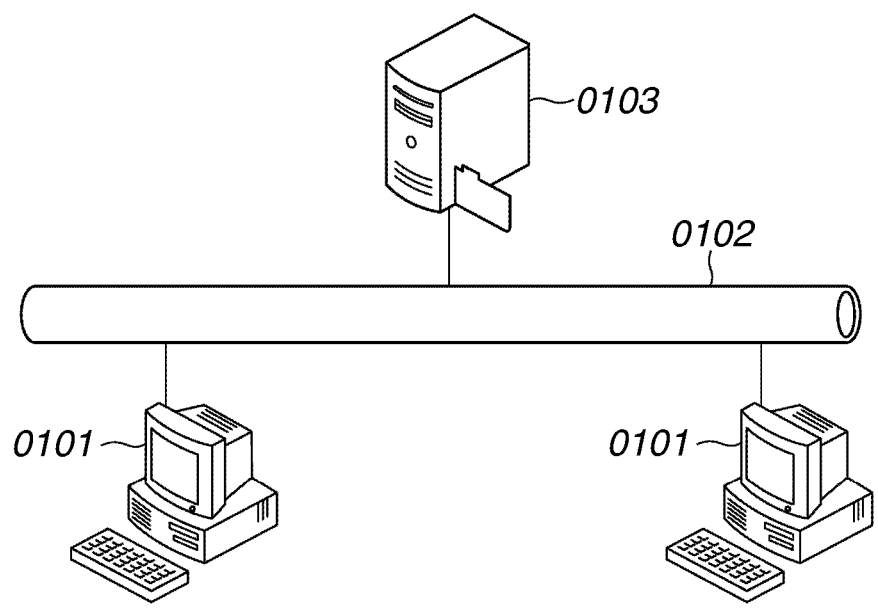
FIG. 1 illustrates an overall configuration of exemplary embodiments.

FIG. 1 illustrates an overall configuration of preferable exemplary embodiments of the present invention. Referring to FIG. 1, information processing apparatuses 0101 are connected to a file server 0103 via a network 0102 capable of command communication.

Figure 2:
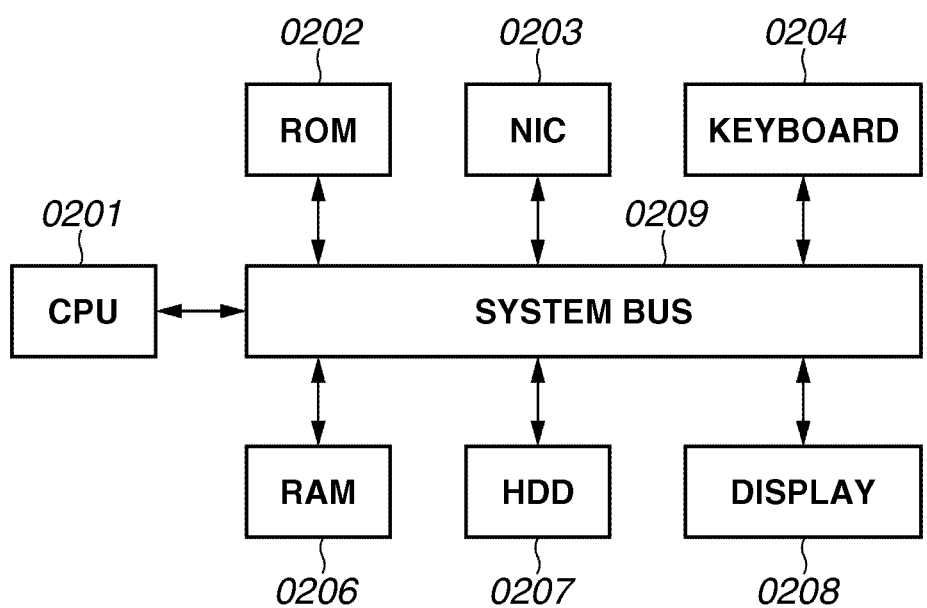
FIG. 2 is a block diagram illustrating a hardware configuration of an information processing apparatus.

FIG. 2 is a block diagram illustrating a hardware configuration of an information processing apparatus 0101 and the file server 0103 illustrated in FIG. 1. The file server 0103 is an external apparatus connectable to the information processing apparatuses 0101, and may also be a personal computer (PC).

A central processing unit (CPU) 0201 is a control unit of the information processing apparatus 0101. The CPU 0201 executes an application program, an operating system (OS), and a document management application according to embodiments of the present invention stored in a hard disk drive (HDD) 0207. The CPU 0201 also performs control to temporarily store in a random access memory (RAM) 0206 information and files necessary for program execution.

A read-only memory (ROM) 0202 is a storage device for storing programs, such as basic I/O programs, font data used for file processing, and other various data such as template data.

A network interface card (NIC) 0203 serves as an interface to the network 0102. The information processing apparatus 0101 exchanges data with an external apparatus via the NIC 0203.

A keyboard 0204 is an input device which functions as an instruction input device. A user uses the keyboard 0204 to input a control command to a drawing program according to embodiments of the present invention or a text.

The RAM 0206 is a temporary storage device which functions as a main memory and a working area for the CPU 0201.

The HDD 0207, one of external storage units, functions as a mass storage device for storing the application program, the OS, and related programs.

A display 0208 is an output device which functions as a display unit for displaying a command input from the keyboard 0204 or the status of the document management application according to embodiments of the present invention.

A system bus 0209 connects between components in the information processing apparatus 0101 and the file server 0103, and manages data flow in the information processing apparatus 0101 and the file server 0103.

Figure 3:
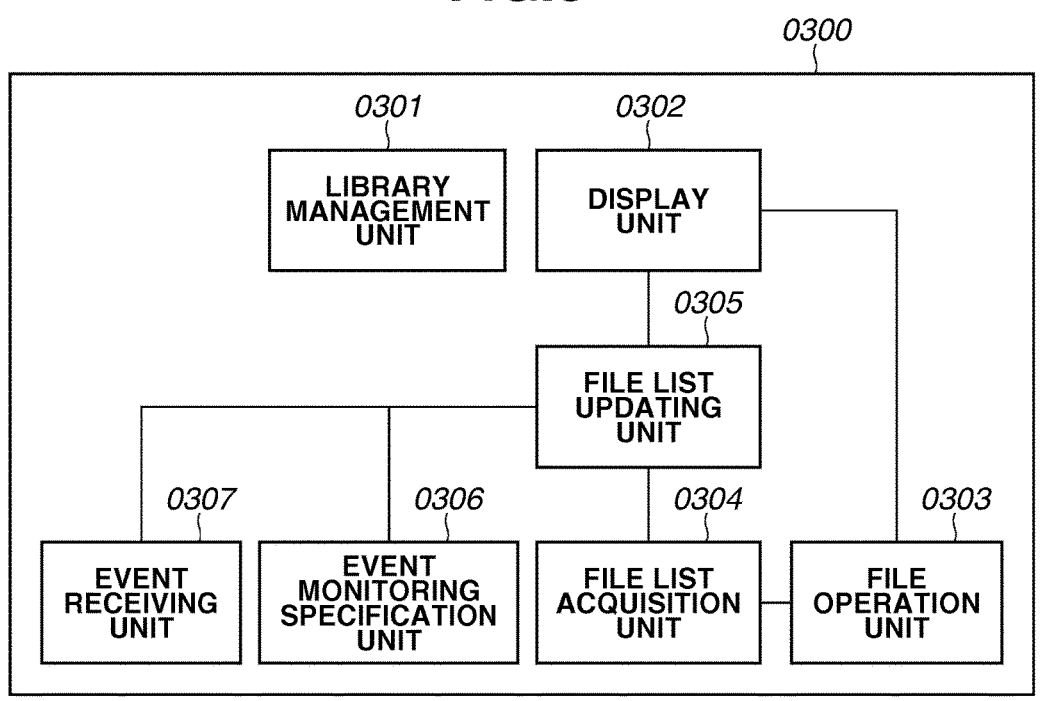
FIG. 3 illustrates an example of a software configuration of a document management application.

FIG. 3 illustrates a software configuration of the document management application for embodying the present invention.

A document management application 0300 is a program module operating on the information processing apparatus 0101. The document management application 0300 is loaded into the RAM 0206 and then executed by the CPU 0201.

A library management unit 0301 manages the location of a file server which can be referred to by the document management application 0300. The document management application 0300 performs file operations referring to the file server managed by the library management unit 0301.

A display unit 0302 receives an input from the keyboard 0204, and displays on the display 0208 the result of processing by the document management application 0300.

A file operation unit 0303 performs file operations. Specifically, the file operation unit 0303 performs operations for moving, copying, and deleting files in the file server 0103 in response to inputs from the keyboard 0204.

A file list acquisition unit 0304 acquires a file list in a folder currently being referred to out of files stored in the file server 0103.

A file list updating unit 0305 updates the display information of a file list screen displayed on the display unit 0302 based on the currently displayed file list and file information (file list) acquired by the file list acquisition unit 0304. Alternatively, the file list updating unit 0305 updates the display information of the file list screen displayed on the display unit 0302 based on file information of an event received from an event receiving unit 0307.

An event monitoring specification unit 0306 requests the file server 0103 to monitor a change in a file at the position currently being displayed on the display unit 0302. When a file in a monitoring target folder specified by the event monitoring specification unit 0306 is changed, the file server 0103 transmits a relevant event to the event receiving unit 0307. Then, the event receiving unit 0307 receives the event.

Upon reception of the event, the event receiving unit 0307 notifies the file list updating unit 0305 of what has occurred in which file.

Figure 4:
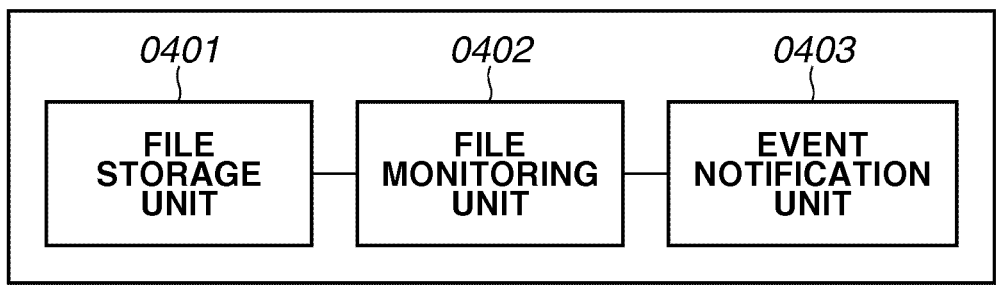
FIG. 4 illustrates an example of a software configuration of a file server.

FIG. 4 illustrates a system configuration of the file server 0103 for embodying the present invention.

A file storage unit 0401 is an area for storing files. Files can be stored in the file storage unit 0401 not only from the document management application 0300 but also from various applications.

A file monitoring unit 0402 monitors a change in a specified folder in the file storage unit 0401 specified by the event monitoring specification unit 0306 of the document management application 0300.

When a file in the specified folder is changed, an event notification unit 0403 notifies the event receiving unit 0307 of information about the changed file.

Specifically, the event notification unit 0403 notifies the event receiving unit 0307 of an "OnCreated" event indicating that a new file has been generated, and an "OnChanged" event indicating that an existing file has been changed. The event notification unit 0403 also notifies the event receiving unit 0307 of an "OnDeleted" event indicating that an existing file has been deleted, and an "OnRenamed" event indicating that an existing file has been renamed.

When the "OnCreated", "OnChanged", or "OnDeleted" event is notified, the event notification unit 0403 also notifies the event receiving unit 0307 of the file name of a file which has been changed. When the "OnRenamed" event is notified, the event notification unit 0403 notifies the event receiving unit 0307 of both the file name of the original file and the file name of the new file.

Figure 5:
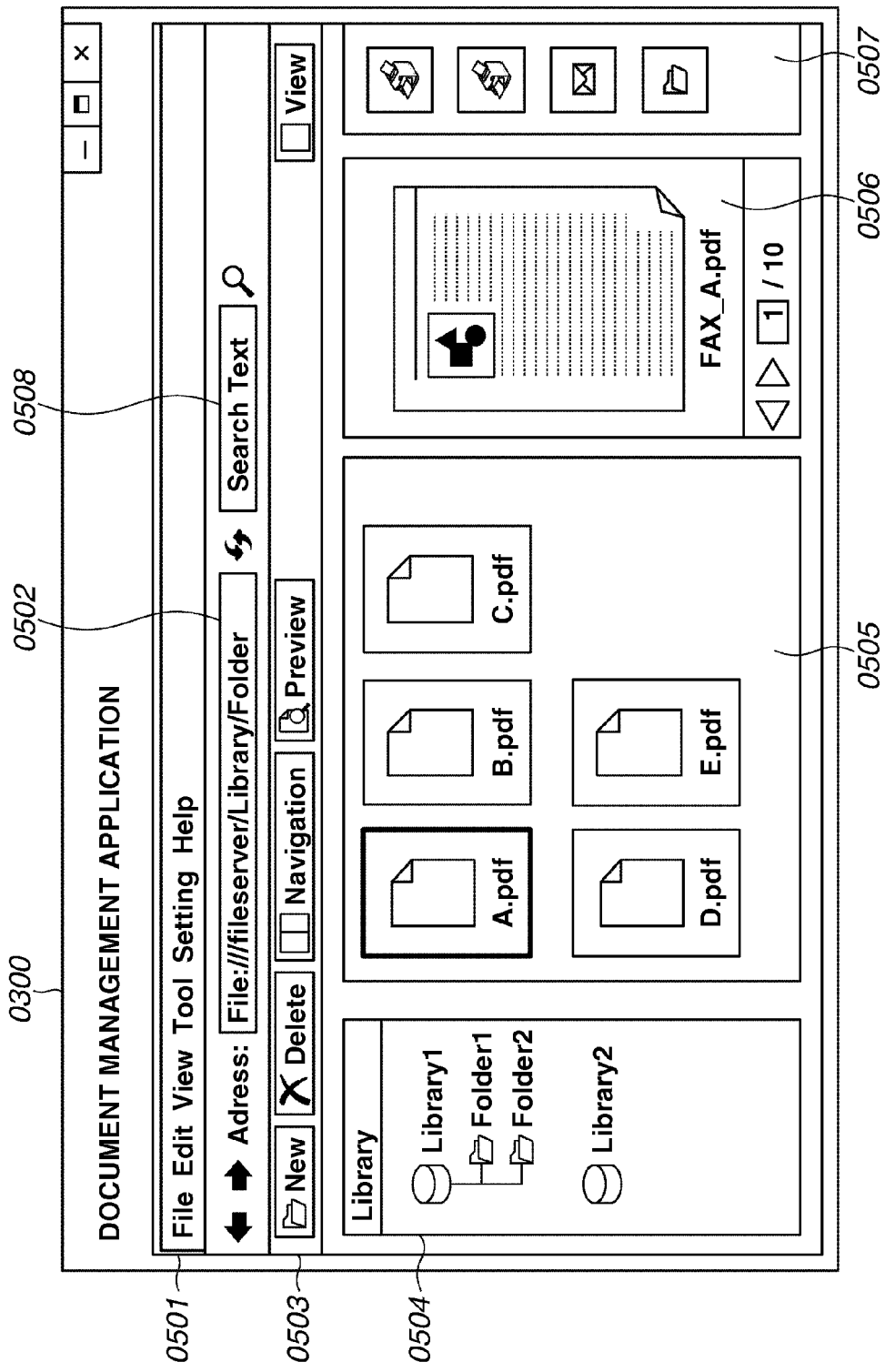
FIG. 5 illustrates an example of a user interface (UI) of the document management application.

FIG. 5 illustrates an example of a UI of the document management application 0300. A menu 0501 displays a list of file operation commands to allow the user to execute these commands.

An address bar 0502 displays a path of a folder currently being referred to. When the user directly inputs a folder path in the address bar 0502, files existing in the folder on the specified path are displayed in list form in a file list view 0505. In the present specification, files existing in the monitoring target folder when the user selects the monitoring target folder are referred to as existing files, and a new file appended therein is referred to as a new file. When it is not necessary to clearly distinguish between an existing file and a new file, these are simply referred to as a file.

When the user inputs a search keyword in a simple search bar 0508, a list of files containing the search keyword are displayed in the file list view 0505.

A tool bar 0503 displays shortcut buttons corresponding to executable operations in the menu 0501. The display in the file list view 0505 is also changed by using the buttons in the tool bar 0503. In the present exemplary embodiment, the display form of the file list view 0505 can be switched between a thumbnail form and a list form.

A navigation pane 0504 displays a list of registered libraries, and indicates the position of a folder currently being referred to. The relation between a library and folders is such that the library is at a higher hierarchical level and folders exist at subordinate hierarchical levels of the library. Further, a setting applied to a library is also applied to folders under the library.

The file list view 0505 displays in list form folders and files included in the folder path displayed in the address bar 0502.

Specifying a display form in the tool bar 0503 changes the display form of the file list view 0505. The example in FIG. 5 illustrates the thumbnail display form.

A preview pane 0506 previews the contents of a file selected in the file list view 0505. The preview pane 0506 can display the contents of a plurality of pages by specifying the next page.

An output bar 0507 includes buttons assigned respective actions. When the user presses a button in the output bar 0507, the action associated with the button is applied to the file selected in the file list view 0505. In the present exemplary embodiment, actions of printing, attachment to mail, and movement to folder (respectively referred to as printing action, attachment-to-mail action, and movement-to-folder action) can be registered in the output bar 0507.

When the user presses the printing action, the document management application 0300 prints the file selected when the printing action is pressed. When the user presses the attachment-to-mail action, the document management application 0300 attaches the file selected when the attachment-to-mail action is pressed to a new mail of a mail client associated with the OS.

When the user presses the movement-to-folder action, the document management application 0300 moves to the registered folder path the file selected when the movement-to-folder action is pressed.

The following describes a method for immediately reflecting a change in the monitoring target folder to the file list view 0505 performed by the document management application 0300 according to the present exemplary embodiment, with reference to the flowchart illustrated in FIG. 6. Each step of flowcharts according to the present specification is implemented when a program relevant to each flowchart is loaded into the RAM 0206 and then executed by the CPU 0201.

In step S0601, the document management application 0300 opens an arbitrary folder selected by the user from a file server registered as a library.

In step S0602, the document management application 0300 acquires a file list of the opened folder, and displays in the file list view 0505 the acquired list of existing files.

In step S0603, the document management application 0300 monitors the opened folder as a monitoring target folder. When any file in the monitoring target folder has been changed, the file server 0103 notifies the document management application 0300 of information about the change in the folder. In the present specification, information about a change in a file is referred to as an event.

In step S0604, the document management application 0300 receives an event notified from the file server 0103.

Upon reception of the "OnCreated" event, then in step S0605, the document management application 0300 performs append, rename, or delete processing for the OnCreated event.

Upon reception of the "OnChanged" event, then in step S0606, the document management application 0300 performs append, rename, or delete processing for the OnChanged event.

Upon reception of the "OnDeleted" event, then in step S0607, the document management application 0300 performs append, rename, or delete processing for the OnDeleted event.

Upon reception of the "OnRenamed" event, then in step S0608, the document management application 0300 performs append, rename, or delete processing for the OnRenamed event.

FIG. 7 illustrates a list for defining operations for changing a file list updating method depending on the received event, whether a file notified by the event exists in the acquired file list, and whether, when an entity of the file notified by the event is acquired, the existence of the entity can be confirmed. The file list illustrated in FIG. 7 indicates operations in steps S0605, S0606, S0607, and S0608 of the flowchart illustrated in FIG. 6.

Figure 8:
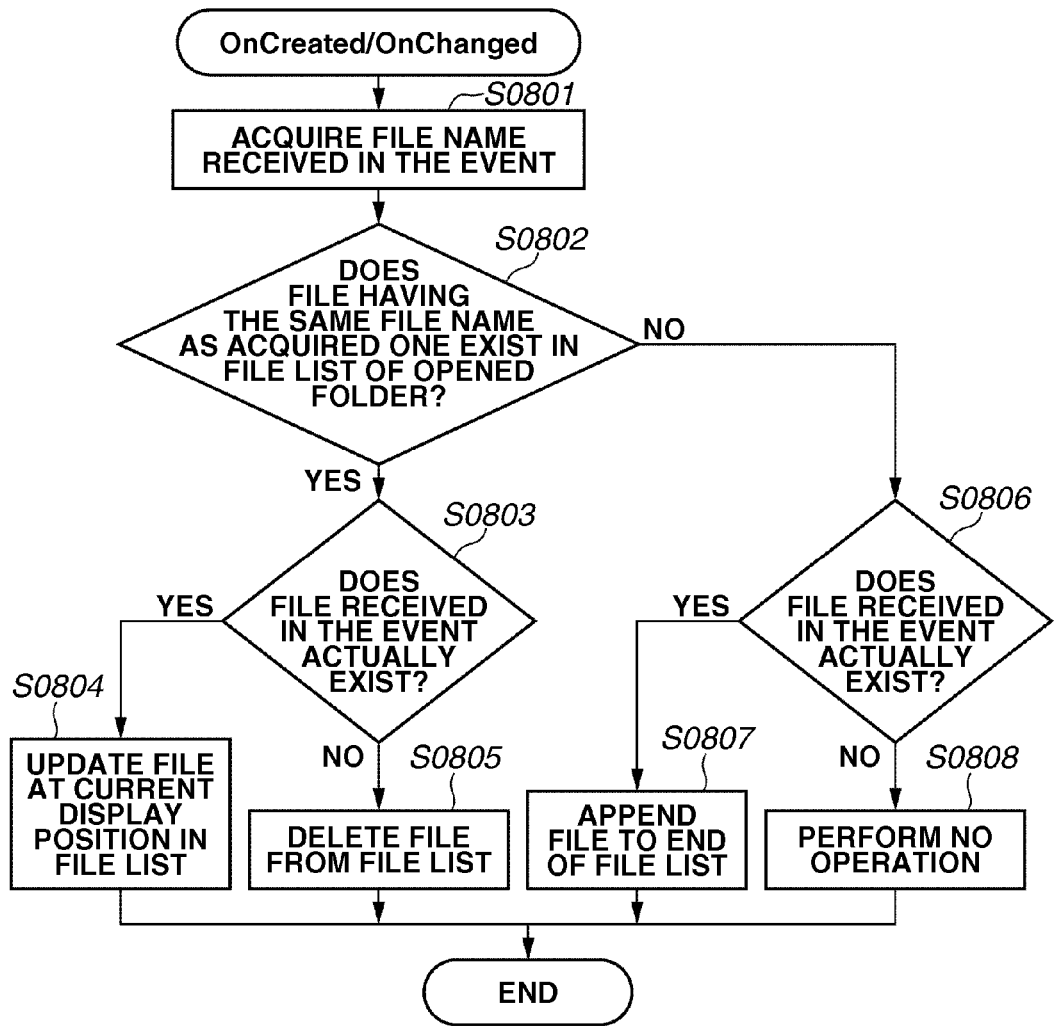
FIG. 8 is a flowchart illustrating processing for updating the file list through OnCreated and OnChanged events.

FIG. 8 is a detailed flowchart illustrating steps S0605 and S0606 performed upon reception of the "OnCreated" event and the "OnChanged" event, respectively.

In step S0801, the document management application 0300 acquires a file name received in the relevant event.

In step S0802, the document management application 0300 determines whether a file having the same file name as the one acquired in step S0801 exists in the file list acquired from the monitoring target folder.

When the file name included in the relevant event exists in the file list acquired from the monitoring target folder (YES in step S0802), then in step S0803, the document management application 0300 determines whether the file received in the relevant event actually exists. Specifically, in step S0803, the document management application 0300 determines whether the file received in the relevant event exists in the monitoring target folder.

When the file name received in the relevant event exists in the file list acquired from the monitoring target folder (YES in step S0802), and actually exists in the monitoring target folder (YES in step S0803), the document management application 0300 determines that the relevant file has been updated. Then in step S0804, the document management application 0300 updates the file at the current display position in the file list.

When the file name received in the relevant event exists in the file list acquired from the monitoring target folder (YES in step S0802), and does not actually exist in the monitoring target folder (NO in step S0803), the document management application 0300 determines that the relevant file has been deleted. Then in step S0805, the document management application 0300 deletes the file from the file list.

When the file name received in the relevant event does not exist in the file list acquired from the monitoring target folder (NO in step S0802), then in step S0806, the document management application 0300 determines whether the file received in the relevant event actually exists in the monitoring target folder, similar to step S0803.

When the file name received in the relevant event does not exist in the file list acquired from the monitoring target folder (NO in step S0802), and actually exists in the monitoring target folder (YES in step S0806), the document management application 0300 determines that a new file has been appended. Then in step S0807, the document management application 0300 appends the new file to the end of the file list, not depending on a file display condition and a sort condition. The present exemplary embodiment is described to append a new file to the end of the file list at which the new file can be easily recognized by the user. However, the position at which a new file is appended is not limited thereto, and may be any position at which the new file can be easily recognized by the user. For example, a new file may be appended to the top of the file list.

When the file name received in the relevant event does not exist in the file list acquired from the monitoring target folder (NO in step S0802), and does not actually exist in the monitoring target folder (NO in step S0806), the document management application 0300 determines that the folder remains unchanged. Then in step S0808, the document management application 0300 performs no operation.

Figure 9:
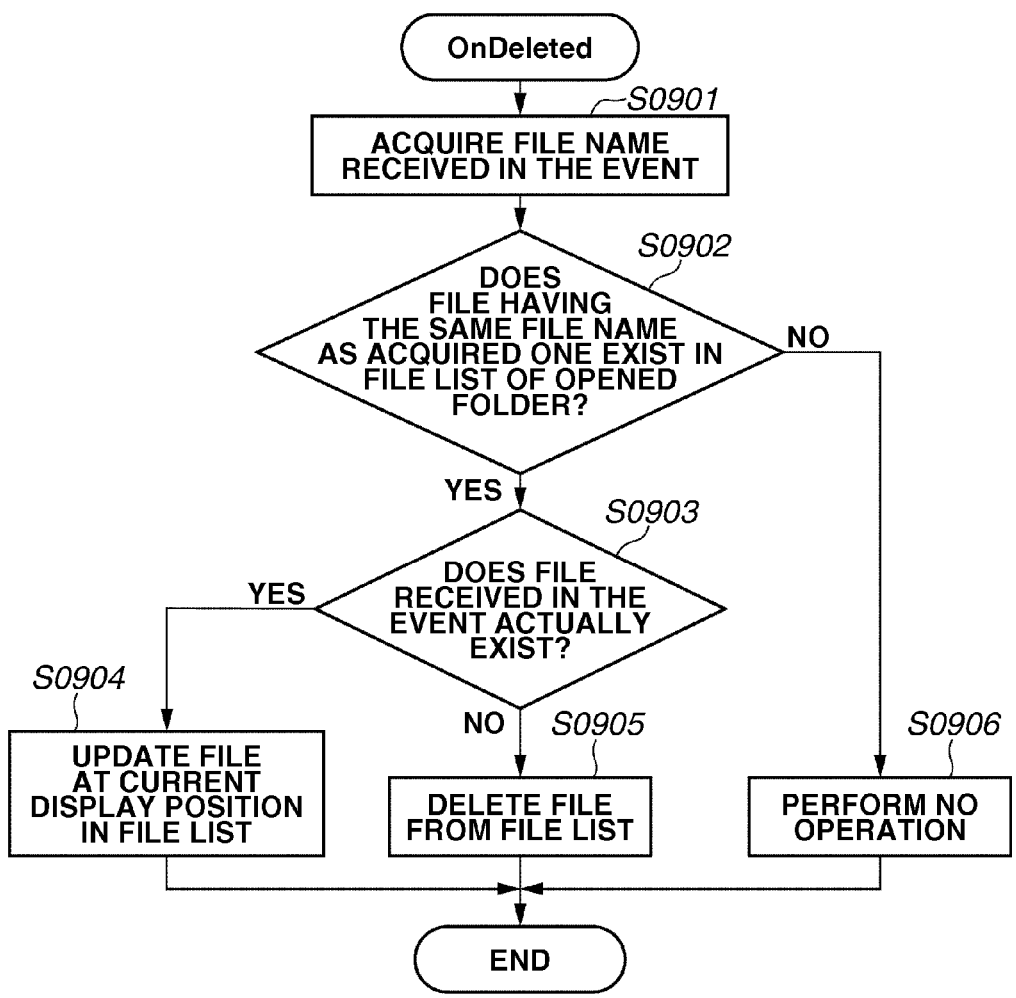
FIG. 9 is a flowchart illustrating processing for updating the file list through an OnDeleted event.

FIG. 9 is a detailed flowchart illustrating step S0607 performed upon reception of the "OnDeleted" event.

In step S0901, the document management application 0300 acquires a file name received in the relevant event.

In step S0902, the document management application 0300 determines whether a file having the same file name as the one received in the relevant event exists in the file list acquired from the monitoring target folder.

When a file having the same file name as the one received in the relevant event exists in the file list acquired from the monitoring target folder (YES in step S0902), then in step S0903, the document management application 0300 determines whether the file received in the relevant event actually exists in the monitoring target folder.

When a file having the same file name as the one received in the relevant event exists in the file list acquired from the monitoring target folder (YES in step S0902), and actually exists in the monitoring target folder (YES in step S0903), the document management application 0300 determines that the relevant file has been updated. Then in step S0904, the document management application 0300 updates the file at the current display position in the file list, similar to step S0804.

When a file having the same file name as the one received in the relevant event exists in the file list acquired from the monitoring target folder (YES in step S0902), and does not actually exist in the monitoring target folder (NO in step S0903), the document management application 0300 determines that the relevant file has been deleted. Then in step S0905, the document management application 0300 deletes the file from the file list, similar to step S0805.

When a file having the same file name as the one received in the relevant event does not exist in the file list acquired from the monitoring target folder (NO in step S0902), the document management application 0300 determines that the folder remains unchanged. Then in step S0906, the document management application 0300 performs no operation, similar to step S0808.

Figure 10A:
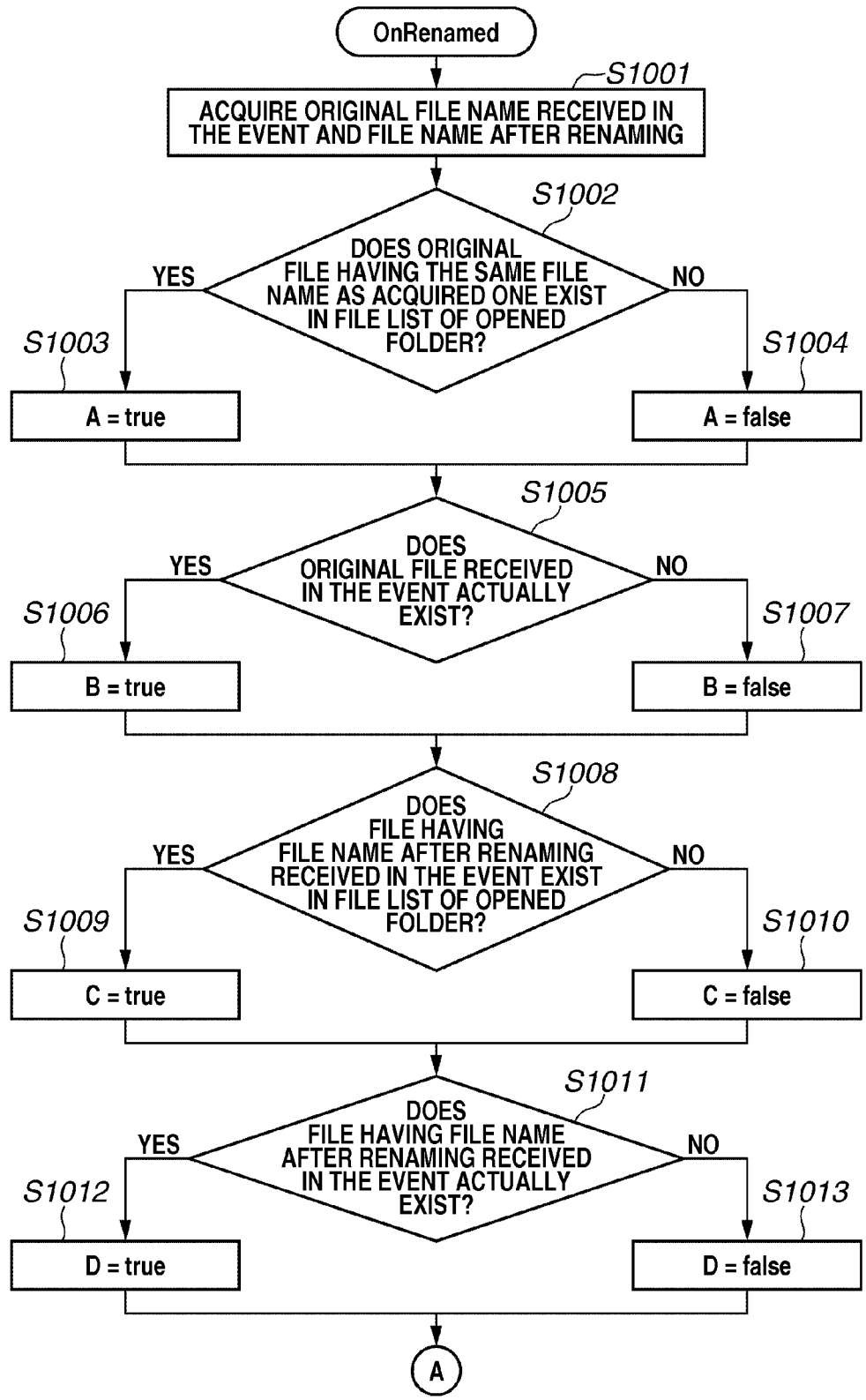
FIGS. 10A and 10B are flowcharts illustrating processing for updating the file list through an OnRenamed event.
Figure 10B:
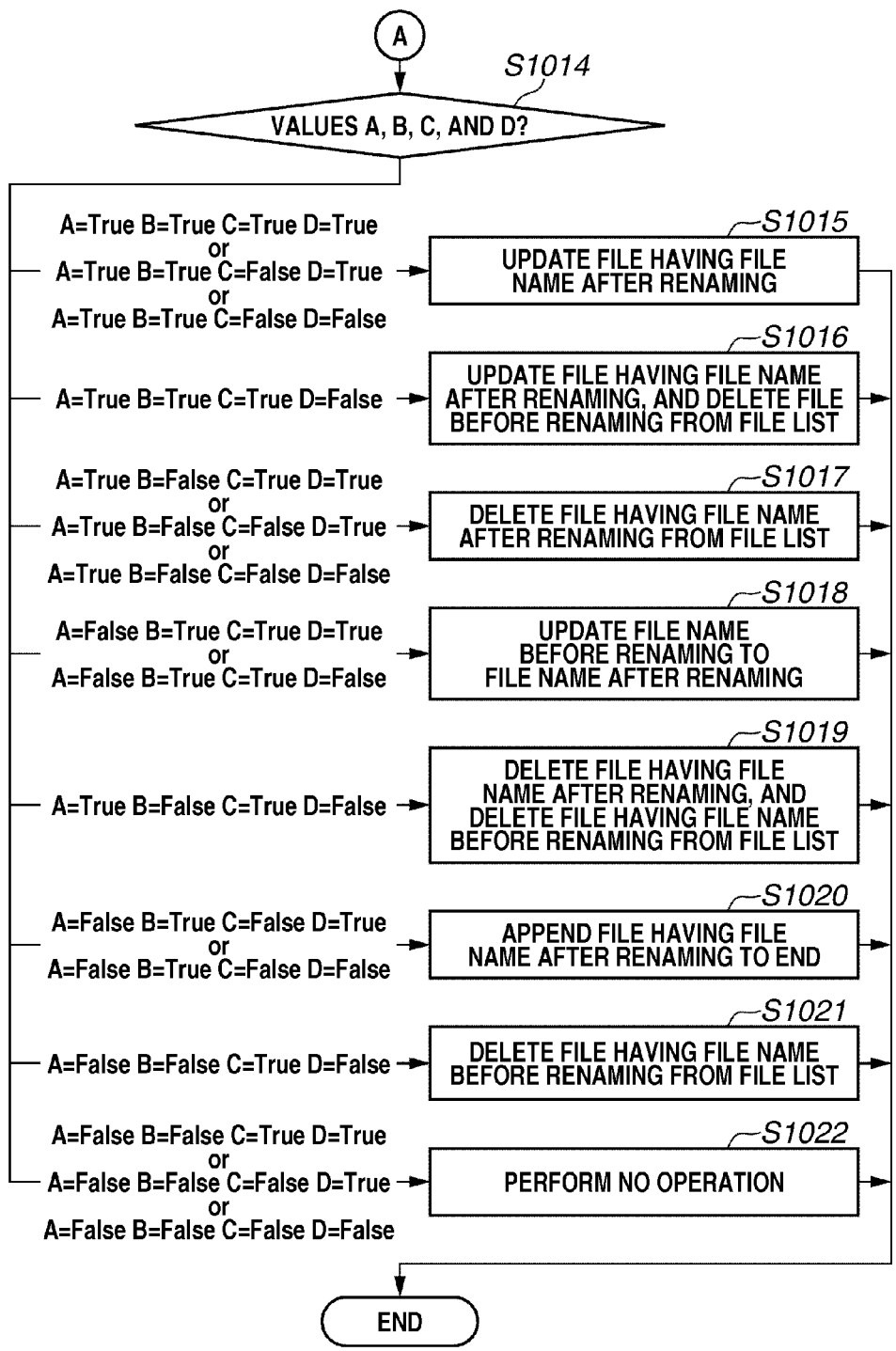

FIGS. 10A and 10B are detailed flowcharts illustrating step S0608 performed upon reception of the "OnRenamed" event.

In step S1001, the document management application 0300 acquires an original file name received in the relevant event and a file name after renaming.

In step S1002, the document management application 0300 determines whether an original file having the same file name as the one received in the relevant event exists in the file list for the monitoring target folder. When an original file name exists in the file list for the monitoring target folder (YES in step S1002), then in step S1003, the document management application 0300 stores A=True. Otherwise, when an original file name does not exist in the file list (NO in step S1002), then in step S1004, the document management application 0300 stores A=False.

In step S1005, the document management application 0300 determines whether the original file received in the relevant event actually exists in the monitoring target folder. When the original file received in the relevant event actually exists in the monitoring target folder (YES in step S1005), then in step S1006, the document management application 0300 stores B=True. Otherwise, when the original file received in the relevant event does not actually exist in the monitoring target folder (NO in step S1005), then in step S1007, the document management application 0300 stores B=False.

In step S1008, the document management application 0300 determines whether the file having the file name after renaming received in the relevant event exists in the file list for the monitoring target folder. When the file having the file name after renaming received in the relevant event exists in the file list for the monitoring target folder (YES in step S1008), then in step S1009, the document management application 0300 stores C=True. Otherwise, when the file having the file name after renaming received in the relevant event does not exist in the file list (NO in step S1008), then in step S1010, the document management application 0300 stores C=False. In step S1011, the document management application 0300 determines whether the file having the file name after renaming received in the relevant event actually exists in the monitoring target folder.

When the file having the file name after renaming received in the relevant event actually exists in the monitoring target folder (YES in step S1011), then in step S1012, the document management application 0300 stores D=True. Otherwise, when the file having the file name after renaming received in the relevant event does not actually exist in the monitoring target folder (NO in step S1011), then in step S1013, the document management application 0300 stores D=False.

In step S1014, the document management application 0300 refers to the values A, B, C, and D to change the method for appending the relevant file to the file list depending on combinations of the values A, B, C, and D. When A to D are all True, when A=True, B=True, C=False, and D=True, or when A=True, B=True, C=False, and D=False, then in step S1015, the document management application 0300 updates the file having the file name after renaming, and the changed file name is displayed at the same position in the file list.

When A=True, B=True, C=True, and D=False, then in step S1016, the document management application 0300 updates the file having the file name after renaming, displays the file name at the same position in the file list, and deletes the file name before renaming from the file list.

When A=True, B=False, C=True, and D=True, when A=True, B=False, C=False, and D=True, or when A=True, B=False, C=False, and D=False, then in step S1017, the document management application 0300 deletes the file having the file name after renaming from the file list.

When A=False, B=True, C=True, and D=True, or when A=False, B=True, C=True, and D=False, then in step S1018, the document management application 0300 updates the original file name before renaming to the file name after renaming, and does not move the relevant file position in the file list.

When A=True, B=False, C=True, and D=False, then in step S1019, the document management application 0300 deletes the file having the file name after renaming from the file list, and also deletes the file having the original file name before renaming.

When A=False, B=True, C=False, and D=True, or when A=False, B=True, C=False, and D=False, then in step S1020, the document management application 0300 appends the file having the file name after renaming to the end of the file list.

When A=False, B=False, C=True, and D=False, then in step S1021, the document management application 0300 deletes the file having the original file name before renaming from the file list.

When A=False, B=False, C=True, and D=True, when A=False, B=False, C=False, and D=True, or when A=False, B=False, C=False, and D=False, then in step S1022, the document management applications 0300 performs no operation assuming that files remain unchanged.

As described above, a new file is appended to the end of the file list, and an updated file is updated at the same position.

The following describe screens obtained by embodying the present exemplary embodiment.

FIG. 5 illustrates an example of a UI of the document management application 0300 displaying a list of existing files stored in the folder specified in the address bar 0502. The file list has been sorted by file name.

When a new file is appended in the folder specified in the address bar 0502, the document management application 0300 receives the relevant event from the file server 0103, and updates the screen illustrated in FIG. 5 to the screen (file list) illustrated in FIG. 18. If the file name of a new file 1801 is Add.pdf, the new file will be appended between A.pdf and B.pdf in the file list view 0505 when complying the sorting rule.

However, according to the present exemplary embodiment, the new file appended in the monitoring target folder is appended to the end of the file list, as with the file 1801. Thus, while the user is referring to files sequentially from the top downward in sorted order, the new file is not inserted between files as a result of sorting, but is appended to the end of the file list. This allows the user to easily notice the appended new file.

The screen may be updated so that the new file is displayed at the lower end, at the upper end, or at the top of the file list, other than at the end of the file list. Also when existing files are displayed in the file list view 0505 in a state where the existing files are sorted by data type or data size, the document management application 0300 performs processing according to the present exemplary embodiment, allowing the user to easily recognize a change in the monitoring target folder.

Although, in the first exemplary embodiment, the document management application 0300 updates the file list upon reception of an event, some file servers are not capable of event transmission. In a second exemplary embodiment, the document management application 0300 determines whether the file server is capable of event transmission. The following describes a method for appending a new file through periodical monitoring when the document management application 0300 determines that the file server is not capable of event transmission. In the descriptions of the second exemplary embodiment, points duplicated with the first exemplary embodiment will be omitted.

In library registration processing, the document management application 0300 specifies a registration class to the library management unit 0301. When the registration class is "DIRECTLY REFERABLE", a reference target file server is able to edit files thereon. When the registration class is "NOT DIRECTLY REFERABLE", the reference target file server is unable to edit files thereon.

A Server Message Block (SMB) server is an example of a file server having a registration class of "DIRECTLY REFERABLE". A Web-based Distributed Authoring and Versioning (WebDAV) server is an example a file server having a registration class of "NOT DIRECTLY REFERABLE".

Figure 19A:
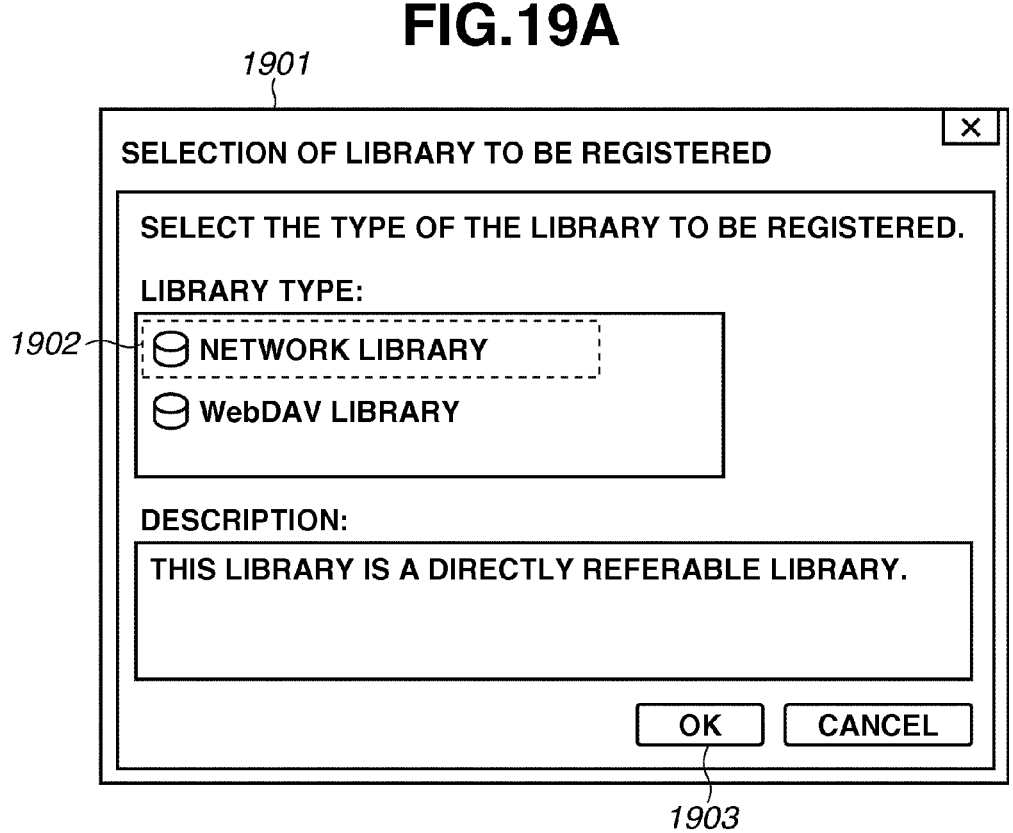
FIGS. 19A and 19B illustrate examples of UIs of the document management application.
Figure 19B:
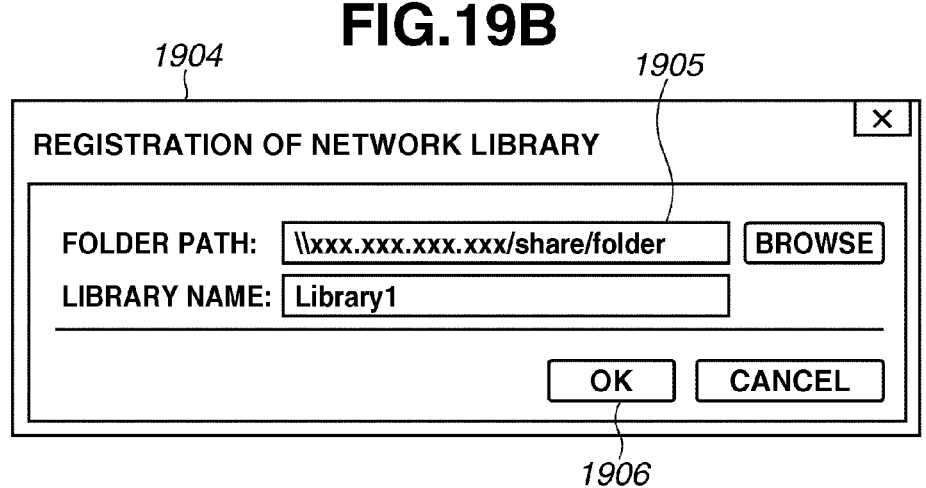

When the user registers as a library a file server in the library management unit 0301 of the document management application 0300, the user specifies whether the registration class is "DIRECTLY REFERABLE". FIGS. 19A and 19B illustrate examples of UIs displayed in the library registration processing.

FIG. 19A illustrates an example of a library selection screen. When the user executes a command for displaying the screen illustrated in FIG. 19A with the menu 0501, the screen illustrated in FIG. 19A appears. A library type selection list 1902 in a library selection screen 1901 displays a list of registerable libraries. Types of registerable libraries are defined by the document management application 0300.

When the user selects a library type and then selects an OK button 1903, a library registration screen appears.

FIG. 19B illustrates an example of a network library registration screen. A network library registration screen 1904 is displayed when the user selects NETWORK LIBRARY in the library type selection list 1902.

The user specifies a path of the folder to be registered in a folder path specification text box in the screen illustrated in FIG. 19B. When the user specifies a library name for the registration target folder and then presses an OK button 1906, the library is registered in the document management application 0300, and displayed in the navigation pane 0504.

Figure 11:
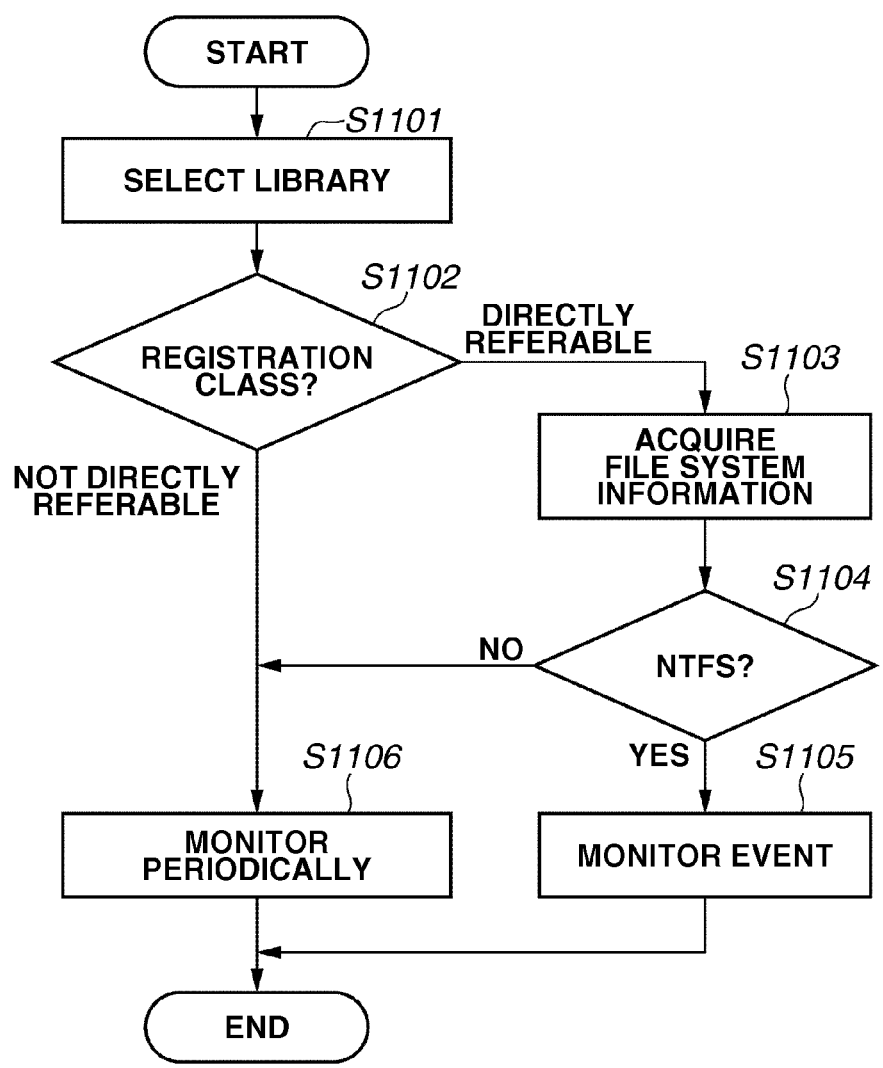
FIG. 11 is a flowchart illustrating processing for determining a file server type.

FIG. 11 is a detailed flowchart illustrating processing for determining whether, after the library is registered as described above, the document management application 0300 updates the file list through an event or through periodical monitoring.

In step S1101, the document management application 0300 selects a user-selected library from the registered libraries.

In step S1102, the document management application 0300 determines library information (registration class) registered in the selected library.

When the library information indicates that a directly referable library (DIRECTLY REFERABLE in step S1102), then in step S1103, the document management application 0300 acquires file server information from the path of the registered library information.

In step S1104, the document management application 0300 determines whether the file server employs the New Technology (NT) File System.

When the server employs the NT File System (YES in step S1104), the document management application 0300 determines that the file server is capable of event transmission, then in step S1105, the document management application 0300 monitors an event from the file server.

Otherwise, when the registration information registered in the selected library is "NOT DIRECTLY REFERABLE" (NOT DIRECTLY REFERABLE in step S1102), or when the file server information acquired in step S1103 is not the NT File System (NO in step S1104), the document management application 0300 determines that the file server corresponding to the selected library cannot be monitored with regard to events.

Then in step S1106, the document management application 0300 periodically monitors the file server. When periodically monitoring the file server, the document management application 0300 acquires a file list for the target folder at predetermined fixed intervals, and compares the file list currently displayed on the document management application 0300 with the acquired file list. As a result of the comparison, the document management application 0300 appends to the end a file which exists only in the acquired file list, and deletes from the acquired file list a file which does not exist in the currently displayed file list.

Thus, the document management application 0300 is able to switch between event monitoring and periodical monitoring.

Although, in first exemplary embodiment, the document management application 0300 updates the file list upon reception of an event, some specific applications perform a unique operation depending on a file operation. For example, when overwriting is instructed, a specific application performs the following processing instead of directly updating the file. In the descriptions of a third exemplary embodiment, points duplicated with the first and the second exemplary embodiments will be omitted.

When overwriting is instructed, the specific application generates a new file having an extension of .tmp as a different file from the original file subjected to overwriting. At the timing of this generation processing, the file server issues the OnCreated event to the document management application 0300. With the new file having an extension of .tmp generated when overwriting is specified, the extension .tmp is highly likely to have a hidden file attribute, the extension is highly likely to be .tmp, and the file name is highly likely to be "$Recycler.DT,~$".

Then, the specific application changes the extension of the original file subjected to overwriting to .tmp. At the timing of the file name change processing, the file server issues the OnRenamed event to the document management application 0300.

Then, the specific application changes to the original file name the file name of the file having an extension of .tmp generated as a different file from the original file and stores such file, thus achieving overwriting and storing. Since the file name has been changed in the storage processing, the file server issues the OnRenamed event to the document management application 0300.

Subsequently, at the timing of the delete processing for deleting the renamed file having an extension of .tmp, the file server issues the OnDeleted event to the document management application 0300.

The third exemplary embodiment will describe a method in which, even if such a specific application exists, the document management application 0300 appends a new file to the end, similar to the first exemplary embodiment, and updates the updated file at the same position.

Figure 12:
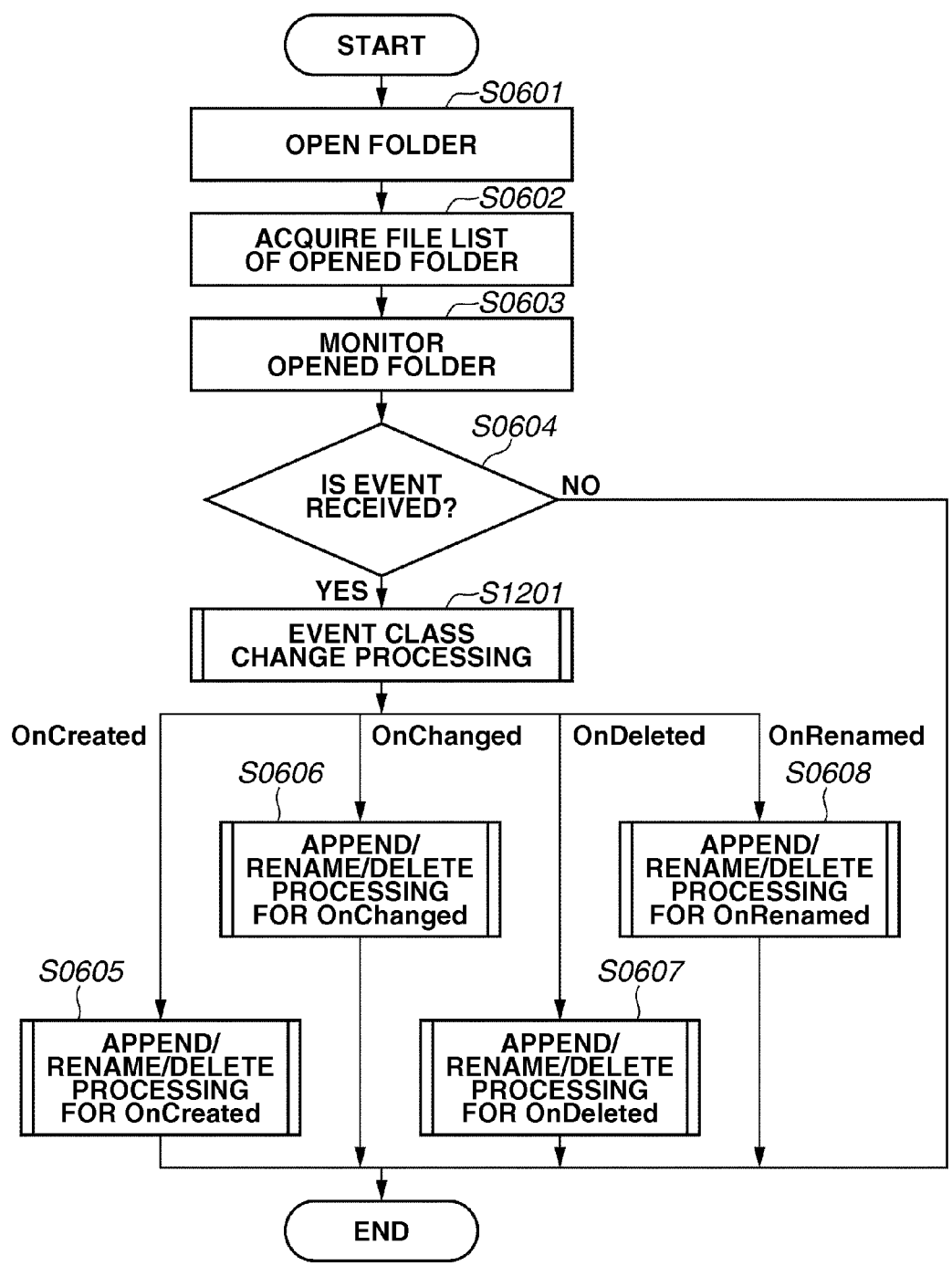
FIG. 12 is a flowchart illustrating processing for updating the file list.

FIG. 12 is a flowchart illustrating processing in which the document management application 0300 updates the file list according to a received event. In the descriptions of FIG. 12, elements duplicated with those in FIG. 6 will be omitted.

When the document management application 0300 receives an event (YES in step S0604), then in step S1201, the document management application 0300 performs event class change processing. The document management application 0300 changes the received event class as required through the event class change processing, and performs steps S0605, S0606, S0607, and S0608 based on the changed event.

Figure 13:
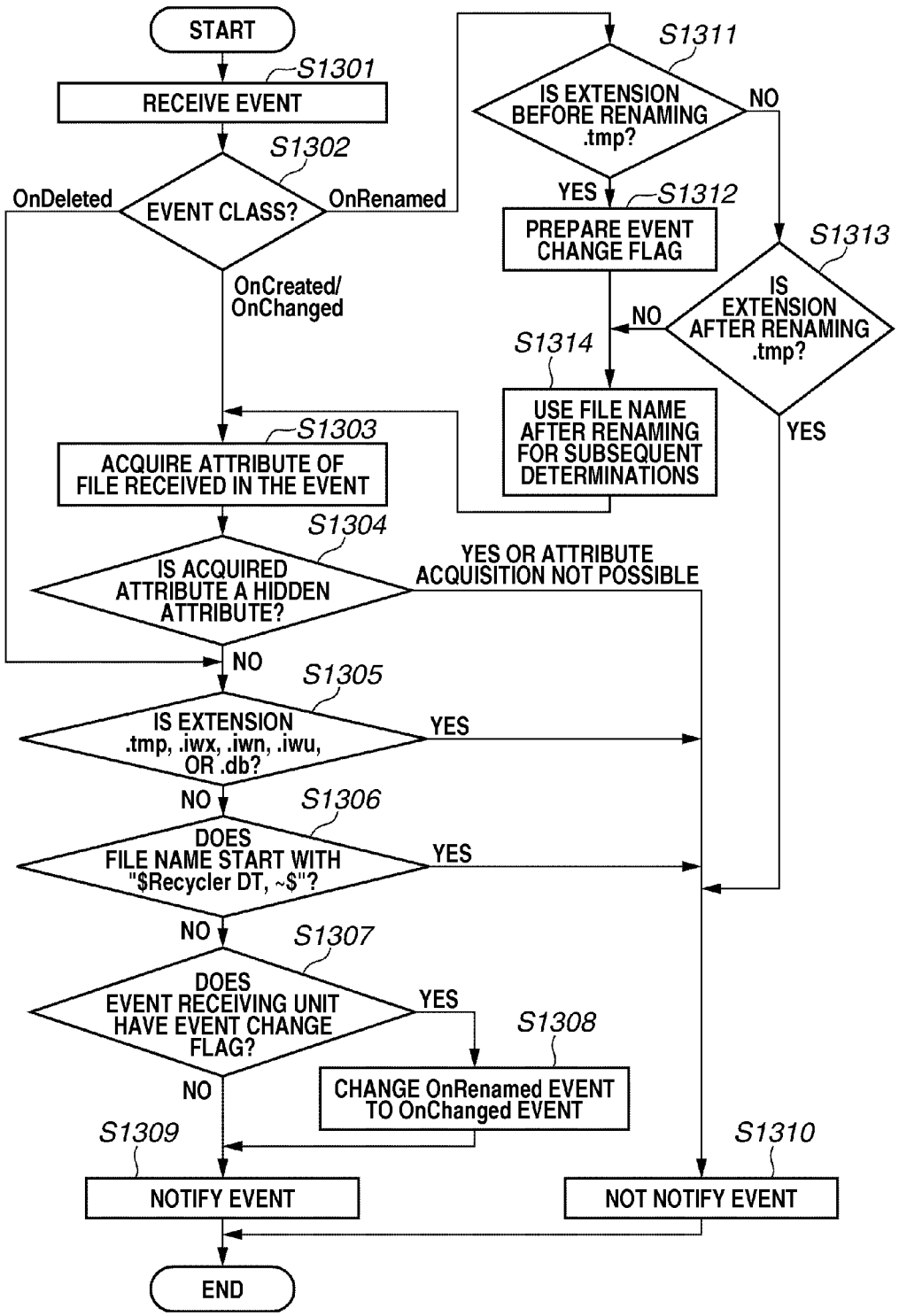
FIG. 13 is a flowchart illustrating details of event class change processing.

FIG. 13 is a detailed flowchart illustrating the event class change processing in step S1201. Basically, processing illustrated in FIG. 13 is performed by the event receiving unit 0307 of the document management application 0300.

In step S1301, the event receiving unit 0307 receives an event. In step S1302, the event receiving unit 0307 determines an event class of the received event.

When the event class of the received event is determined to be OnCreated or OnChanged (OnCreated/OnChanged in step S1302), then in step S1303, the event receiving unit 0307 acquires a file attribute received in the relevant event.

In step S1304, the event receiving unit 0307 determines whether the acquired attribute is a hidden attribute.

When the acquired attribute is determined to be a hidden attribute, or when the attribute cannot be acquired since the file itself does not exist in the monitoring target folder of the file server (YES or ATTRIBUTE ACQUISITION NOT POSSIBLE in step S1304), then in step S1310, the event receiving unit 0307 does not notify the file list updating unit 0305 of the relevant event. Specifically, when the OnCreated event is received and the file corresponding to the relevant event has a hidden attribute, the received event is highly likely to be an event for a file generated as another file for overwriting described above.

It is not necessary to update the file list view 0505 by using a file corresponding to such an event. Therefore, the event receiving unit 0307 does not notify the file list updating unit 0305 of the relevant event. When the event receiving unit 0307 does not notify the event in step S1310, the event receiving unit 0307 deletes the received event.

When the attribute acquired in step S1304 is determined not to be a hidden attribute (NO in step S1304), then in step S1305, the event receiving unit 0307 determines whether the file corresponding to the event received in step S0604 has a specific extension. Although, in the present exemplary embodiment, the event receiving unit 0307 determines whether the extension is .tmp, .iwx, .iwn, .iwu, or .db, the extension is not limited thereto.

The processing in step S1305 is achieved when the document management application 0300 refers to the extension of the file corresponding to the relevant event in a folder of a monitoring target file server.

The file generated as another file for overwriting does not necessarily have a hidden attribute. Therefore, for example, even if the file generated as another file for overwriting does not have a hidden attribute, the event receiving unit 0307 is able to suitably determine whether it should notify the file list updating unit 0305 of the relevant event, by performing the processing in step S1305.

When the extension of the file corresponding to the relevant event is determined to be a specific extension (YES in step S1305), then in step S1310, the event receiving unit 0307 does not notify the file list updating unit 0305 of the relevant event.

When the extension of the file corresponding to the relevant event is determined not to be a specific extension (NO in step S1305), then in step S1306, the event receiving unit 0307 determines whether the file name of the file corresponding to the relevant event starts with a specific name. Although, in the present exemplary embodiment, the event receiving unit 0307 determines whether the file name of the file corresponding to the relevant event starts with "$Recycler.DT,~$", the specific name is not limited thereto.

The file generated as another file for overwriting does not necessarily have a hidden attribute and have the above-described extended specific extension. Therefore, for example, also when the file generated as another file for overwriting does not have a hidden attribute, and the extension of the file generated for overwriting is not a specific extension, the event receiving unit 0307 is able to suitably determine whether it should notify the file list updating unit 0305 of the relevant event.

When the file name of the file corresponding to the relevant event is determined to start with the specific name (YES in step S1306), then in step S1310, the event receiving unit 0307 does not notify the file list updating unit 0305 of the relevant event.

When the file name of the file corresponding to the relevant event is determined not to start with the specific name (NO in step S1306), then in step S1307, the event receiving unit 0307 determines whether an event change flag is provided.

When the event change flag is determined not to be provided (NO in step S1307), then in step S1309, the event receiving unit 0307 notifies the file list updating unit 0305 of the relevant event as it is.

Otherwise, when the event change flag is determined to be provided (YES in step S1307), then in step S1308, the event receiving unit 0307 changes the OnRenamed event to the OnChanged event. Then in step S1309, the event receiving unit 0307 notifies the file list updating unit 0305 of the relevant event.

When the received event is the OnDeleted event (OnDeleted in step S1302), the event receiving unit 0307 advances the processing to step S1305.

When the received event is the OnRenamed event (OnRenamed in step S1302), then in step S1311, the event receiving unit 0307 determines whether the extension before renaming is .tmp. When the event notification unit 0403 notifies the event receiving unit 0307 of the OnRenamed event, it notifies the event receiving unit 0307 of both the file name of the original file and the file name of the new file. Therefore, the event receiving unit 0307 is able to achieve the processing in step S1311 by referring to the file name of the original file.

When the extension before renaming is determined to be .tmp (YES in step S1311), then in step S1312, the event receiving unit 0307 prepares an event change flag. In step S1314, the event receiving unit 0307 uses the file name after renaming for subsequent determinations. Then, the processing proceeds to step S1303.

When the extension before renaming is determined not to be .tmp (NO in step S1311), then in step S1313, the event receiving unit 0307 determines whether the extension after renaming is .tmp. The event receiving unit 0307 is able to achieve the processing in step S1313 by referring to the file name of the new file notified in the OnRenamed event by the event notification unit 0403.

When the extension after renaming is determined to be .tmp (YES in step S1313), then in step S1310, the event receiving unit 0307 does not notify the file list updating unit 0305 of the relevant event. Otherwise, when the extension is determined not to be .tmp (NO in step S1313), the event receiving unit 0307 advances the processing to step S1314.

Thus, by changing the event class in this way, the document management application 0300 is able to perform an overwriting operation as expected at the time of overwriting even if overwriting processing due to an application-specific operation is executed. Specifically, the position of the overwritten file remains unchanged in the file list view 0505.

Referring to FIG. 13, the execution order of the determination processing insteps S1304 to S1306 is not limited thereto. For example, steps S1305, S1304, and S1306 may be executed in this order. Further, it is not necessary to execute all of the above-described determination processing. At least one of steps S1304 to S1306 may be executed.

Although, in the first exemplary embodiment, the document management application 0300 updates the file list upon reception of an event, an unexpected event may occur because of the difference between the OS of the file server 0103 and the OS of the information processing apparatus 0101. For example, when overwriting an arbitrary file in the monitoring target folder is instructed, the situation indicates that an arbitrary file is changed. Therefore, although the document management application 0300 expects the reception of the OnChanged event, it may receive the OnDeleted event and the OnCreated event in succession because of the difference between the two OS's. The difference between the OS of the file server 0103 and the OS of the information processing apparatus 0101 is, for example, the difference between the OS versions.

A fourth exemplary embodiment will describe a method in which, even if a different event occurs for each OS, an updated file is updated at the same position. In the descriptions of the fourth exemplary embodiment, points duplicated with the first to the third exemplary embodiments will be omitted.

Figure 14:
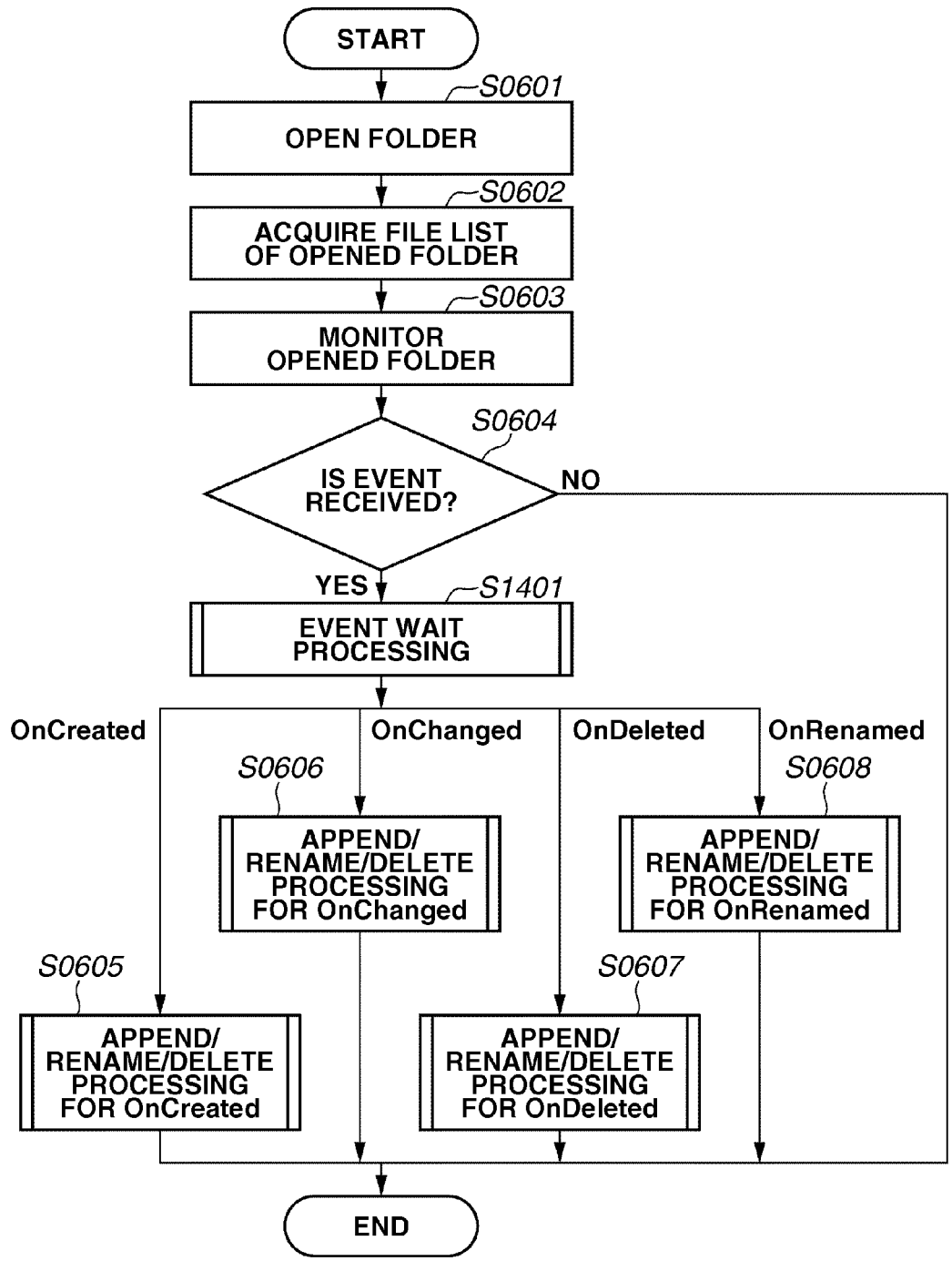
FIG. 14 is a flowchart illustrating processing for updating the file list according to an event.

FIG. 14 is a flowchart illustrating processing for updating the file list according to a received event.

In the descriptions of FIG. 14, elements duplicated with those in FIG. 6 will be omitted. When an event is received (YES in step S0604), then in step S1401, the document management application 0300 performs event wait processing. The document management application 0300 changes the received event as required through the event wait processing, and performs steps S0605, S0606, S0607, and S0608 based on the changed event.

Figure 15:
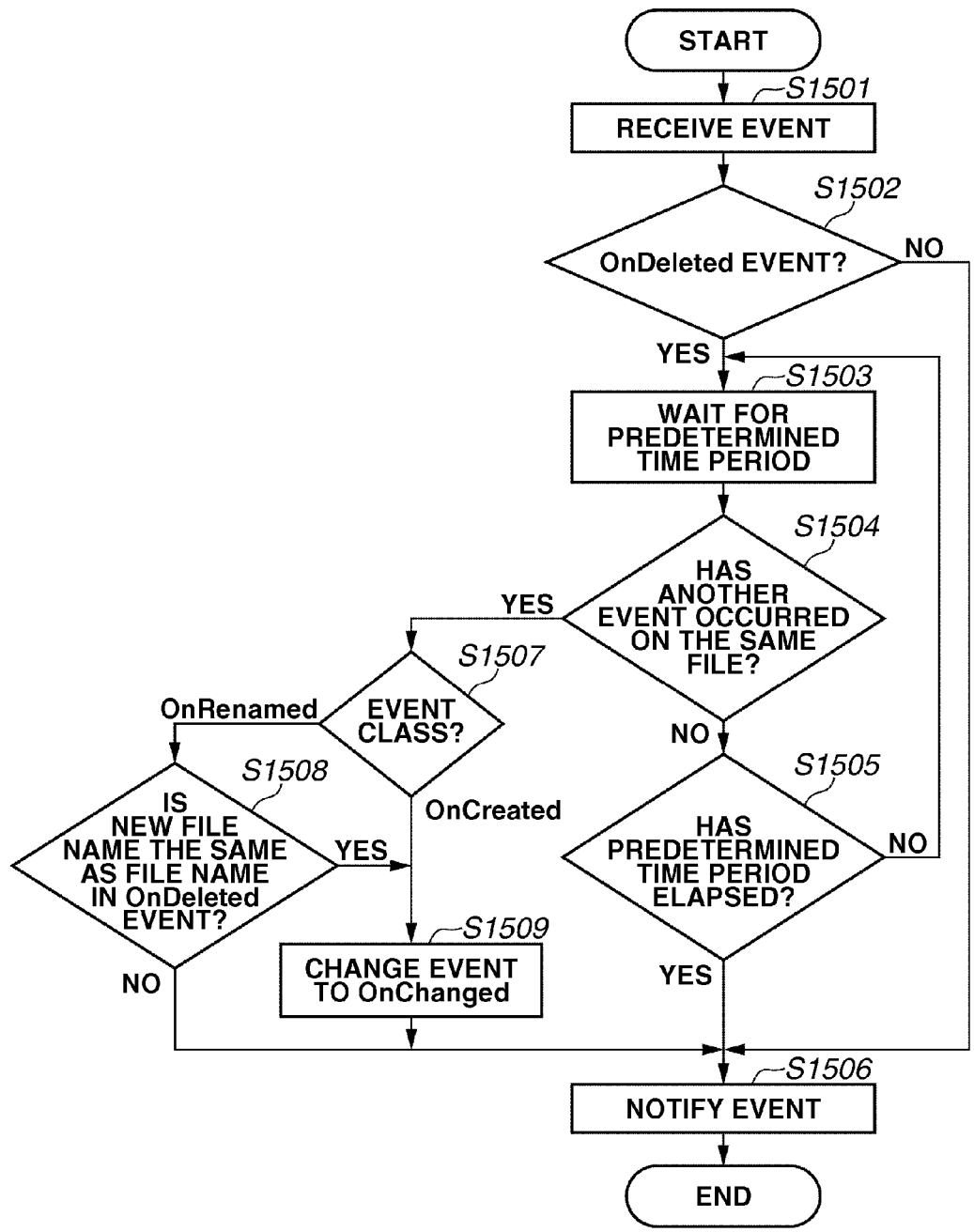
FIG. 15 is a flowchart illustrating details of event wait processing.

FIG. 15 is a detailed flowchart illustrating the event wait processing in step S1401.

When the received event is the OnDeleted event, the event receiving unit 0307 waits for a predetermined time period to receive a new event. Then, when the event receiving unit 0307 receives the OnRenamed event for the same file name within a predetermined time period, the event receiving unit 0307 changes the OnDeleted event and the OnRenamed event to the OnChanged event. When the event receiving unit 0307 does not receives the next event or receives only an event for a different file within a predetermined time period, the event receiving unit 0307 notifies the file list updating unit 0305 of the received event as it is. As a result, the document management application 0300 performs processing corresponding to the relevant event.

In step S1501, the event receiving unit 0307 receives an event. In step S1502, the event receiving unit 0307 determines whether the received event is the OnDeleted event.

When the received event is determined not to be the OnDeleted event (NO in step S1502), then in step S1506, the event receiving unit 0307 notifies the file list updating unit 0305 of the received event as it is.

Otherwise, when the received event is determined to be the OnDeleted event (YES in step S1502), then in step S1503, the event receiving unit 0307 waits for an arbitrary predetermined time period, without immediately notifying the file list updating unit 0305 of the relevant event.

In step S1504, the event receiving unit 0307 determines whether another event has occurred during the waiting period. When another event has not occurred (NO in step S1504), then in step S1505, the event receiving unit 0307 determines whether the predetermined time period has elapsed.

When the predetermined time period has elapsed (YES in step S1505), then in step S1506, the event receiving unit 0307 notifies the file list updating unit 0305 of the OnDeleted event as it is.

Otherwise, when the event receiving unit 0307 receives another event during the waiting period (YES in step S1504), then in step S1507, the event receiving unit 0307 determines the type of the received event.

When the received event is determined to be the OnCreated event (OnCreated in step S1507), then in step S1509, the event receiving unit 0307 deletes the OnDeleted event and the OnCreated event, and changes the event to the OnChanged event.

When the event which has occurred is determined to be the OnRenamed event (OnRenamed in step S1507), then in step S1508, the event receiving unit 0307 determines whether the file name of the new file described in the OnRenamed event is the same as that described in the OnDeleted event.

When the file name of the new file described in the OnRenamed event is determined to be the same as that described in the OnDeleted event (YES in step S1508), then in step S1509, the event receiving unit 0307 deletes the OnDeleted event and the OnRenamed event, and changes the event to the OnChanged event.

Thus, even if an unexpected event occurs because of the difference between the OS of the file server 0103 and the OS of the information processing apparatus 0101, the document management application 0300 is able to perform an overwriting operation as expected at the time of overwriting.

Specifically, the position of an overwritten file remains unchanged in the file list view 0505.

Even when the event receiving unit 0307 receives the OnDeleted event from the file server 0103, the document management application 0300 is able to suitably determine whether the file corresponding to the OnDeleted event is to be displayed or hidden, by performing the processing according to the present exemplary embodiment.

Although, in the above-described first to fourth exemplary embodiments, the file list is updated upon reception of an event, an example of appending a new file to the end is described. However, when a lot of files are stored in the monitoring target folder, they cannot be displayed in the file list view 0505 without scrolling. In this case, the user may not notice the new file even if it is appended to the end. A fifth exemplary embodiment describes a method for preventing the user from overlooking a new file. In the descriptions of the fifth exemplary embodiment, points duplicated with the first to the fourth exemplary embodiments will be omitted.

Figure 16:
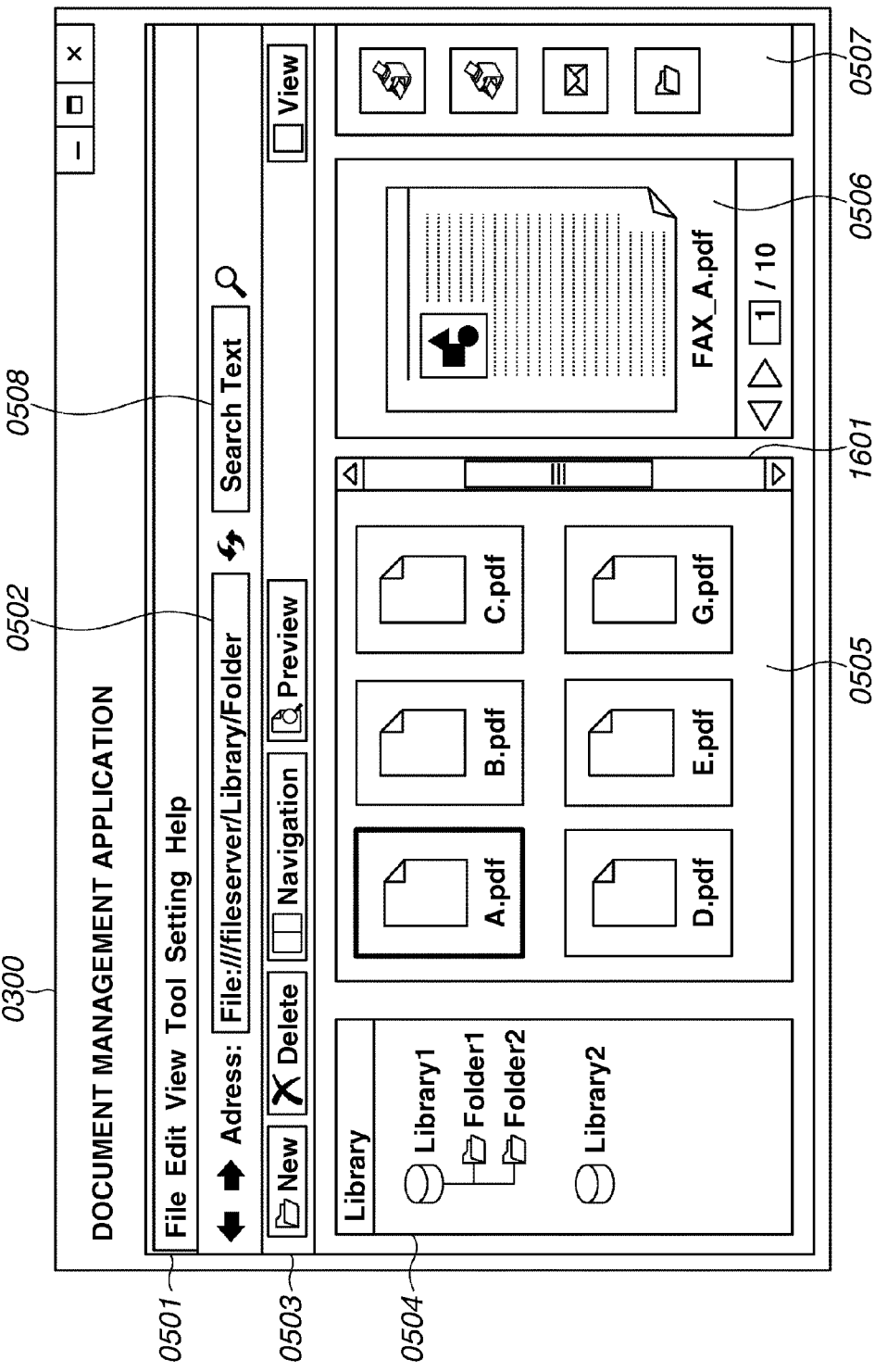
FIG. 16 illustrates an example of a UI of the document management application.

FIG. 16 illustrates an example of a UI for the file list view 0505 of the document management application 0300. In the descriptions of FIG. 16, elements duplicated with those in FIG. 5 will be omitted. A scroll bar 1601 is displayed when a file list does not fit into the display area of the file list view 0505. Vertically moving the scroll bar 1601 enables displaying all of files stored in the folder.

Figure 17:
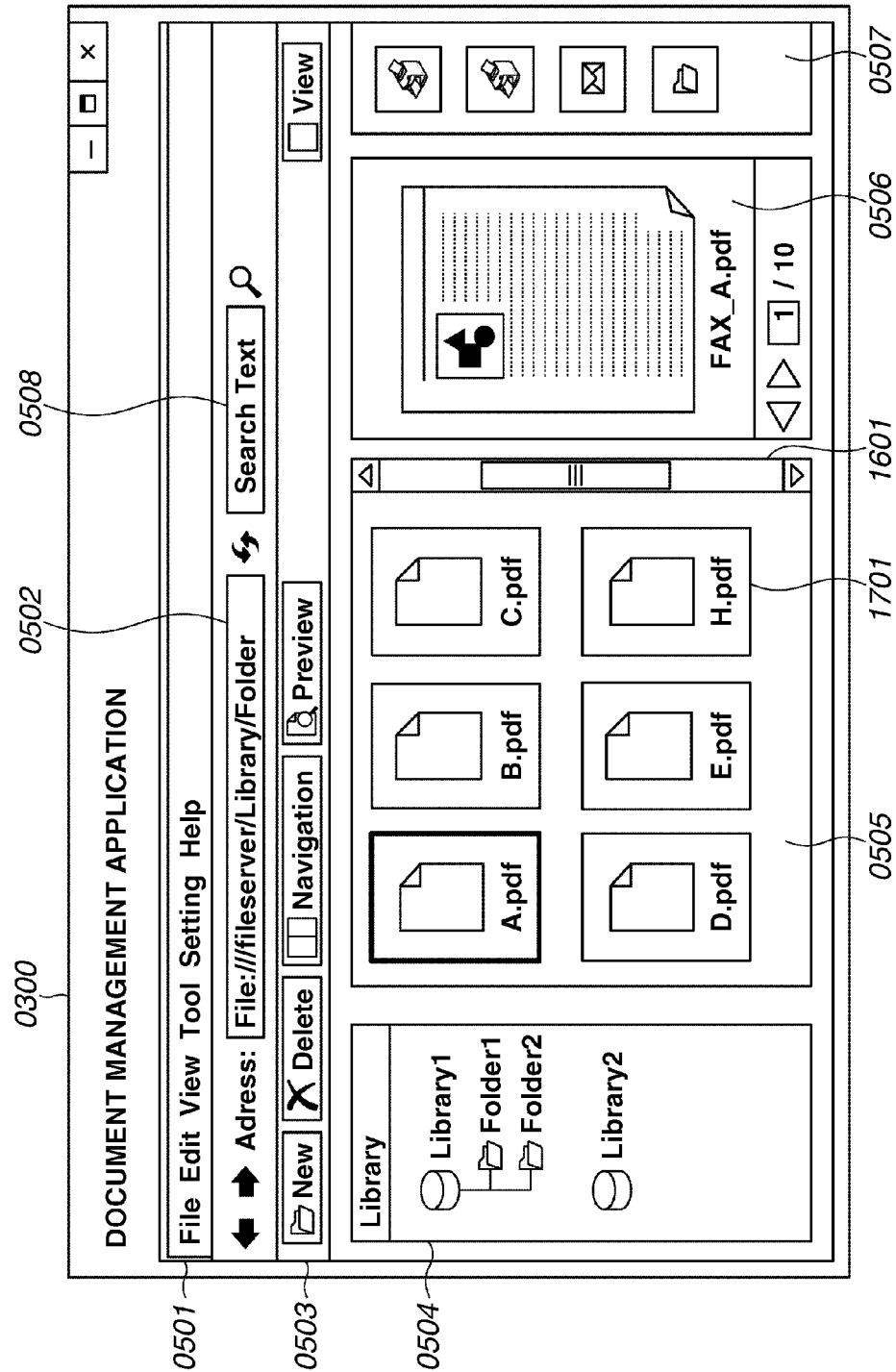
FIG. 17 illustrates an example of a UI of the document management application.

When a new file is appended in a state where files A.pdf to G.pdf are displayed, as illustrated in the UI in FIG. 16, the new file is inserted at the end of the display area. Then, the example of a UI illustrated in FIG. 16 is changed to an example of a UI illustrated in FIG. 17. When a file H.pdf is appended as a new file, a file 1701 is appended to the end of the display area of the file list view 0505, and the file G.pdf is moved toward the end.

Thus, appending the new file to the end of the currently viewable area improves a search ability when appending a file. In addition, the document management application 0300 may simply append a new file to the end, and, at the same time, automatically moves the scroll bar 1601 so that the new file appended to the end may be displayed.

Figure 20:
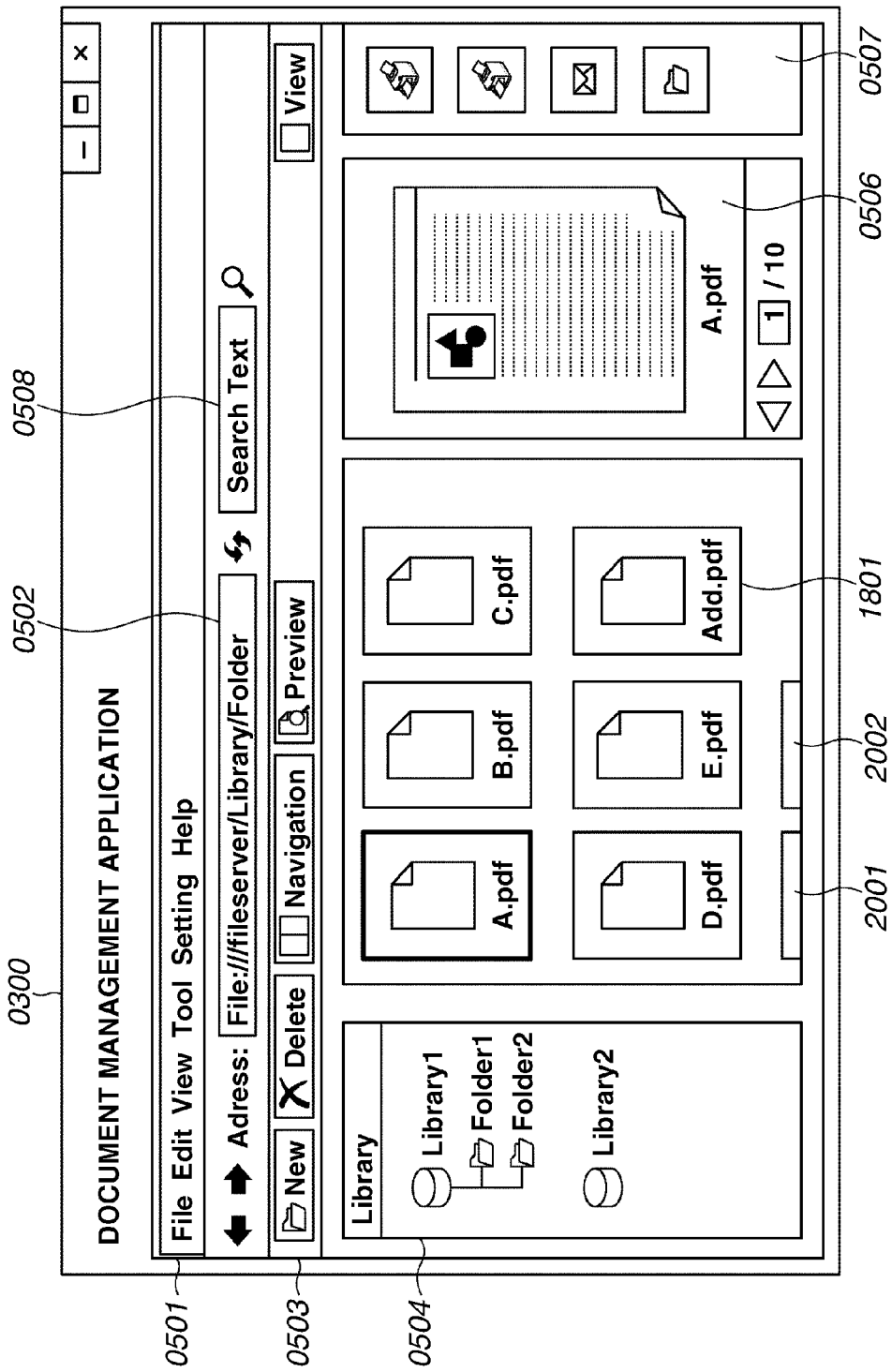
FIG. 20 illustrates an example of a UI of the document management application.

Moreover, as illustrated in FIG. 20 according to the present specification, when a part of existing files 2001 and 2002 in the second half of the file list is displayed in the file list view 0505, a new file may be appended at the position 1801 illustrated in FIG. 20 in consideration of user's view.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to embodiments of the present invention, the user is able to easily recognize a change in the monitoring target folder.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2012-250181 filed Nov. 14, 2012, which is hereby incorporated by reference herein in its entirety.

What is claimed is:

1. An information processing apparatus connectable to an external apparatus, the information processing apparatus comprising:
   a memory storing instructions; and
   a processor which is capable of executing the instructions causing the information processing apparatus to:
   display, on a screen, files existing in a folder of the external apparatus,
   receive an event indicating a change in the folder from the external apparatus, and
   update display content of the screen according to the received event,
   wherein, in a case where a delete event indicating that a first file of the existing files in the folder is to be deleted is received from the external apparatus, the display content of the screen is not updated, and in a case where another event corresponding to the first file is further not received from the external apparatus within a predetermined time period after receiving the delete event, the display content of the screen is updated according to the delete event so that the first file is deleted,
   and wherein, in a case where a delete event indicating that a second file of the existing files in the folder is to be deleted is received from the external apparatus, the display content of the screen is not updated, and in a case where an append event, corresponding to second file information, indicating that a new file is appended is further received from the external apparatus within a predetermined time period after receiving the delete event, the delete event and the append event are regarded as events of change to the second file by a user operation, and the display content of the screen is updated according to the change, without updating the display content of the screen according to the delete event.

2. The information processing apparatus according to claim 1, wherein the instructions further cause the information processing apparatus to:
   delete the event when the information indicating a change in the folder is an event indicating that a new file has been appended to the folder and the new file corresponding to the event has a hidden attribute.

3. The information processing apparatus according to claim 1, wherein the instructions further cause the information processing apparatus to:
   delete the event when the information indicating a change in the folder is an event indicating that a new file has been appended to the folder and an extension of the new file corresponding to the event is a specific extension.

4. The information processing apparatus according to claim 1, wherein the instructions further cause the information processing apparatus to:
  delete the event when the information indicating a change in the folder is an event indicating that a new file has been appended to the folder and the new file corresponding to the event includes a specific name.

5. The information processing apparatus according to claim 1, wherein, when a delete event indicating that a third file of the existing files in the folder is to be deleted is received from the external apparatus and a rename event indicating that a file name of the third file is changed is further received from the external apparatus within a predetermined time period after receiving the delete event, the display content of the screen is updated according to a change event indicating that the third file is changed.

6. The information processing apparatus according to claim 1, wherein, when the event indicating a change in the folder is received, if a file name received in the event does not exist in a list of the existing files of the folder and further if a file received in the event actually exists in the folder of the external apparatus, the screen is updated so that the existing files are arranged in order according to a specified sorting method and the file received in the event is appended to a lower end of the existing files in order not according to the specified sorting method.

7. The information processing apparatus according to claim 6,
  wherein, when the event indicating a change in the folder is received, if the file name received in the event exists in the list of the existing files of the folder and further if the file received in the event actually exists in the folder of the external apparatus, the screen is updated so that the existing files are arranged in order according to the specified sorting method and the file received in the event is updated at a current display position in the list of the existing files arranged in order according to the specified sorting method,
  and wherein, when the event indicating a change in the folder is received, if the file name received in the event exists in the list of the existing files of the folder and further if the file received in the event does not actually exist in the folder of the external apparatus, the screen is updated so that the existing files are arranged in order according to the specified sorting method and the file received in the event is deleted from the list of the existing files arranged in order according to the specified sorting method.

8. The information processing apparatus according to claim 1, wherein a display position of the file appended according to the append event differs from a display position of the file changed according to the event of change.

9. A method for controlling an information processing apparatus connectable to an external apparatus, the method comprising:
  displaying, on a screen, files existing in a folder of the external apparatus,
  receiving an event indicating a change in the folder from the external apparatus, and
  updating display content of the screen according to the received event,
  wherein, in a case where a delete event indicating that a first file of the existing files in the folder is to be deleted is received from the external apparatus, the display content of the screen is not updated, and in a case where another event corresponding to the first file is further not received from the external apparatus within a predetermined time period after receiving the delete event, the display content of the screen is updated according to the delete event so that the first file is deleted,
  and wherein, in a case where a delete event indicating that a second file of the existing files in the folder is to be deleted is received from the external apparatus, the display content of the screen is not updated, and in a case where an append event, corresponding to second file information, indicating that a new file is appended is further received from the external apparatus within a predetermined time period after receiving the delete event, the delete event and the append event are regarded as events of change to the second file by a user operation, and the display content of the screen is updated according to the change, without updating the display content of the screen according to the delete event.

10. The control method according to claim 9, further comprising:
  deleting the event when the information indicating a change in the folder is an event indicating that a new file has been appended to the folder and the new file corresponding to the event has a hidden attribute.

11. The control method according to claim 9, further comprising:
  deleting the event when the information indicating a change in the folder is an event indicating that a new file has been appended to the folder and an extension of the new file corresponding to the event is a specific extension.

12. The control method according to claim 9, further comprising:
  deleting the event when the information indicating a change in the folder is an event indicating that a new file has been appended to the folder and the new file corresponding to the event includes a specific name.

13. The control method according to claim 9, wherein, when a delete event indicating that a third file of the existing files in the folder is to be deleted is received from the external apparatus and a rename event indicating that a file name of the third file is changed is further received from the external apparatus within a predetermined time period after receiving the delete event, the display content of the screen is updated according to a change event indicating that the third file is changed.

14. The control method according to claim 9, wherein, when the event indicating a change in the folder is received, if a file name received in the event does not exist in a list of the existing files of the folder and further if a file received in the event actually exists in the folder of the external apparatus, the screen is updated so that the existing files are arranged in order according to a specified sorting method and the file received in the event is appended to a lower end of the existing files in order not according to the specified sorting method.

15. The control method according to claim 14,
  wherein, when the event indicating a change in the folder is received, if the file name received in the event exists in the list of the existing files of the folder and further if the file received in the event actually exists in the folder of the external apparatus, the screen is updated so that the existing files are arranged in order according to the specified sorting method and the file received in the event is updated at a current display position in the list of the existing files arranged in order according to the specified sorting method, and wherein, when the event indicating a change in the folder is received, if the file name received in the event exists in the list of the existing files of the folder and further if the file received in the event does not actually exist in the folder of the external apparatus, the screen is updated so that the existing files are arranged in order according to the specified sorting method and the file received in the event is deleted from the list of the existing files arranged in order according to the specified sorting method.

16. The method according to claim 9, wherein a display position of the file appended according to the append event differs from a display position of the filed changed according to the event of change.

17. A storage medium storing a program to be executed by a computer connectable to an external apparatus, the program causing the computer to execute the following processing:

displaying, on a screen, files existing in a folder of the external apparatus, receiving an event indicating a change in the folder from the external apparatus, and updating display content of the screen according to the received event, wherein, in a case where a delete event indicating that a first file of the existing files in the folder is to be deleted is received from the external apparatus, the display content of the screen is not updated, and in a case where another event corresponding to the first file is further not received from the external apparatus within a predetermined time period after receiving the delete event, the display content of the screen is updated according to the delete event so that the first file is deleted, and wherein, in a case where a delete event indicating that a second file of the existing files in the folder is to be deleted is received from the external apparatus, the display content of the screen is not updated, and in a case where an append event, corresponding to second file information, indicating that a new file is appended is further received from the external apparatus within a predetermined time period after receiving the delete event, the delete event and the append event are regarded as events of change to the second file by a user operation, and the display content of the screen is updated according to the change, without updating the display content of the screen according to the delete event.

18. The storage medium according to claim 17, further comprising:

deleting the event when the information indicating a change in the folder is an event indicating that a new file has been appended to the folder and the new file corresponding to the event has a hidden attribute.

19. The storage medium according to claim 17, further comprising:

deleting the event when the information indicating a change in the folder is an event indicating that a new file has been appended to the folder and an extension of the new file corresponding to the event is a specific extension.

20. The storage medium according to claim 17, further comprising:

deleting the event when the information indicating a change in the folder is an event indicating that a new file has been appended to the folder and the new file corresponding to the event includes a specific name.

21. The storage medium according to claim 17, wherein, when a delete event indicating that a third file of the existing files in the folder is to be deleted is received from the external apparatus and a rename event indicating that a file name of the third file is changed is further received from the external apparatus within a predetermined time period after receiving the delete event, the display content of the screen is updated according to a change event indicating that the third file is changed.

22. The storage medium according to claim 17, wherein, when the event indicating a change in the folder is received, if a file name received in the event does not exist in a list of the existing files of the folder and further if a file received in the event actually exists in the folder of the external apparatus, the screen is updated so that the existing files are arranged in order according to a specified sorting method and the file received in the event is appended to a lower end of the existing files in order not according to the specified sorting method.

23. The storage medium according to claim 22, wherein, when the event indicating a change in the folder is received, if the file name received in the event exists in the list of the existing files of the folder and further if the file received in the event actually exists in the folder of the external apparatus, the screen is updated so that the existing files are arranged in order according to the specified sorting method and the file received in the event is updated at a current display position in the list of the existing files arranged in order according to the specified sorting method, and wherein, when the event indicating a change in the folder is received, if the file name received in the event exists in the list of the existing files of the folder and further if the file received in the event does not actually exist in the folder of the external apparatus, the screen is updated so that the existing files are arranged in order according to the specified sorting method and the file received in the event is deleted from the list of the existing files arranged in order according to the specified sorting method.

24. The storage medium according to claim 17, wherein a display position of the file appended according to the append event differs from a display position of the file changed according to the file changed to the even of change.

* * * * *